(12) United States Patent
Lin

(10) Patent No.: US 9,753,855 B2
(45) Date of Patent: *Sep. 5, 2017

(54) HIGH-PERFORMANCE INSTRUCTION CACHE SYSTEM AND METHOD

(71) Applicant: Shanghai XinHao Micro Electronics Co. Ltd., Shanghai (CN)

(72) Inventor: Chenghao Kenneth Lin, Shanghai (CN)

(73) Assignee: Shanghai Xinhao Microelectronics Co., Ltd., Shanghai (CN)

( * ) Notice: Subject to any disclaimer, the term of this patent is extended or adjusted under 35 U.S.C. 154(b) by 263 days.

This patent is subject to a terminal disclaimer.

(21) Appl. No.: 14/410,615

(22) PCT Filed: Jun. 25, 2013

(86) PCT No.: PCT/CN2013/077889
§ 371 (c)(1),
(2) Date: Dec. 23, 2014

(87) PCT Pub. No.: WO2014/000624
PCT Pub. Date: Jan. 3, 2014

(65) Prior Publication Data
US 2015/0149723 A1 May 28, 2015

(30) Foreign Application Priority Data

Jun. 27, 2012 (CN) .......................... 2012 1 0228129

(51) Int. Cl.
*G06F 12/08* (2016.01)
*G06F 12/0875* (2016.01)
*G06F 12/0811* (2016.01)

(52) U.S. Cl.
CPC ...... *G06F 12/0875* (2013.01); *G06F 12/0811* (2013.01); *G06F 2212/452* (2013.01); *Y02B 60/1225* (2013.01)

(58) Field of Classification Search
CPC .... G06F 9/3802; G06F 9/3804; G06F 9/3836; G06F 9/3851; G06F 9/30145;
(Continued)

(56) References Cited

U.S. PATENT DOCUMENTS 5,860,104 A * 1/1999 Witt ...................... G06F 9/3004
711/126
6,279,106 B1 * 8/2001 Roberts ................... G06F 9/322
712/239

(Continued)

FOREIGN PATENT DOCUMENTS

CN 1570888 A 1/2005

*Primary Examiner* — David X Yi
*Assistant Examiner* — Candice Rankin
(74) *Attorney, Agent, or Firm* — Anova Law Group, PLLC

(57) ABSTRACT

A method is provided for facilitating operation of a processor core coupled to a first memory containing executable instructions, a second memory faster than the first memory and a third memory faster than the second memory. The method includes examining instructions being filled from the second memory to the third memory, extracting instruction information containing at least branch information; creating a plurality of tracks based on the extracted instruction information; filling at least one or more instructions that possibly be executed by the processor core based on one or more tracks from a plurality of instruction tracks from the first memory to the second memory; filling at least one or more instructions based on one or more tracks from the plurality of tracks from the second memory to the third memory before the processor core executes the instructions, such that the processor core fetches the instructions from the third memory.

17 Claims, 14 Drawing Sheets

(58) Field of Classification Search
CPC ............... G06F 11/3636; G06F 9/3005; G06F 9/30181; G06F 9/3816; G06F 2201/88; G06F 2201/885; G06F 2212/69; G06F 9/324; G06F 9/3806; G06F 12/0875; G06F 12/0811; G06F 12/08; G06F 12/0815

See application file for complete search history.

(56) References Cited

U.S. PATENT DOCUMENTS

| | | | | |
|---|---|---|---|---|
| 6,311,260 B1 * | 10/2001 | Stone | ...................... | G06F 9/383 711/137 |
| 7,055,004 B2 * | 5/2006 | DeMent | ................ | G06F 12/125 707/999.104 |
| 7,711,929 B2 * | 5/2010 | Burky | ................... | G06F 9/3838 712/216 |
| 2002/0184455 A1 * | 12/2002 | Cho | .................... | G06F 13/1673 711/154 |
| 2004/0172518 A1 | 9/2004 | Saruwatari et al. | | |
| 2006/0282826 A1 * | 12/2006 | Dockser | ............. | G06F 9/30189 717/127 |
| 2008/0162819 A1 * | 7/2008 | Luick | .................. | G06F 12/0862 711/122 |
| 2008/0235460 A1 * | 9/2008 | Togawa | ................ | G06F 8/4442 711/144 |
| 2009/0037696 A1 | 2/2009 | Tanaka et al. | | |
| 2013/0247010 A1 * | 9/2013 | Bradbury | ............. | G06F 9/3005 717/130 |
| 2013/0339610 A1 * | 12/2013 | Collura | .............. | G06F 12/0811 711/123 |

* cited by examiner

HIGH-PERFORMANCE INSTRUCTION CACHE SYSTEM AND METHOD

TECHNICAL FIELD

The present invention generally relates to computer, communication, and integrated circuit technologies and, more particularly, to computer cache systems and methods.

BACKGROUND ART

In general, cache is used to duplicate a certain part of main memory, so that the duplicated part in the cache can be accessed by a processor core or a central processing unit (CPU) core in a short amount of time and thus to ensure continued pipeline operation of the processor core.

Currently, cache addressing is based on the following ways. First, an index part of an address is used to read out a tag from a tag memory. At the same time, the index and an offset part of the address are used to read out contents from the cache. Further, the tag from the tag memory is compared with a tag part of the address. If the tag from the tag memory is the same as the tag part of the address, called a cache hit, the contents read out from the cache are valid. Otherwise, if the tag from the tag memory is not the same as the tag part of the address, called a cache miss, the contents read out from the cache are invalid. For a multi-way set associative cache, the above operations are performed in parallel on each set to detect which way has a cache hit. Contents read out from the set with the cache hit are valid. If all sets experience cache misses, contents read out from any set are invalid. After a cache miss, cache control logic fills the cache with contents from lower level storage medium.

Cache miss can be divided into three types: compulsory miss, conflict miss, and capacity miss. Under existing cache structures, except a small amount of pre-fetched contents, compulsory miss is inevitable. But, the current prefetching operation carries a not-so-small penalty. Further, while a multi-way set associative cache may help reduce conflict misses, the number of way set associative cannot exceed a certain number due to power and speed limitations (e.g., the set-associative cache structure requires that contents and tags from all cache sets addressed by the same index are read out and compared at the same time). Further, with the goal for cache memories to match the speed of the processor core, it is difficult to increase cache capacity. Thus, multiple layers of cache are created, with a lower layer cache having a larger capacity but a slower speed than a higher layer cache.

DISCLOSURE OF INVENTION

Technical Problem

Current modern cache systems normally comprise multiple layers of cache in a multi-way set associative configuration. New cache structures such as victim cache, trace cache, and prefetching (putting the next cache block into a cache buffer while fetching a cache block or under a prefetch instruction) have been used to address certain shortcomings. However, with the widening gap between the speed of the processor and the speed of the memory, the existing cache architectures, especially with the various cache miss possibilities, are still a bottleneck in increasing the performance of modern processors or computing systems.

Solution to Problem

Technical Solution

The disclosed methods and systems are directed to solve one or more problems set forth above and other problems.

The present disclosure includes a method for facilitating operation of a processor core coupled to a first memory containing executable instructions, a second memory with a faster speed than the first memory and a third memory with a faster speed than the second memory. The method includes examining instructions being filled from the second memory to the third memory, extracting instruction information containing at least branch information; creating a plurality of tracks based on the extracted instruction information; filling at least one or more instructions that might possibly be executed by the processor core based on one or more tracks from a plurality of instruction tracks from the first memory to the second memory; filling at least one or more instructions based on one or more tracks from a plurality of the tracks from the second memory to the third memory before the processor core executes the instruction, such that the processor core fetches the at least one or more instructions from the third memory.

The present disclosure can be understood by those skilled in the art in light of the description, the claims, and the drawings of the present disclosure.

Advantageous Effects of Invention

Advantageous Effects

The disclosed systems and methods may provide fundamental solutions to cache structures used by digital systems. Different from traditional cache systems, which fills the cache after cache miss, the disclosed systems and methods fill the instruction cache before the execution of an instruction in the memory, thus avoiding or sufficiently hiding the compulsory miss. Further, the disclosed systems and methods provide essentially a fully associative cache structure to avoid or hide the conflict miss and capacity miss. In addition, the disclosed systems and methods prevent the delay of the critical path of the cache read by tag matching and, thus, can run at a higher clock frequency. Thus, the matching operations and miss rate can be reduced, and the power consumption can be significantly lowered. Other advantages and applications of the present invention will be apparent to professionals in the art.

BRIEF DESCRIPTION OF DRAWINGS

Description of Drawings

Figure 1:
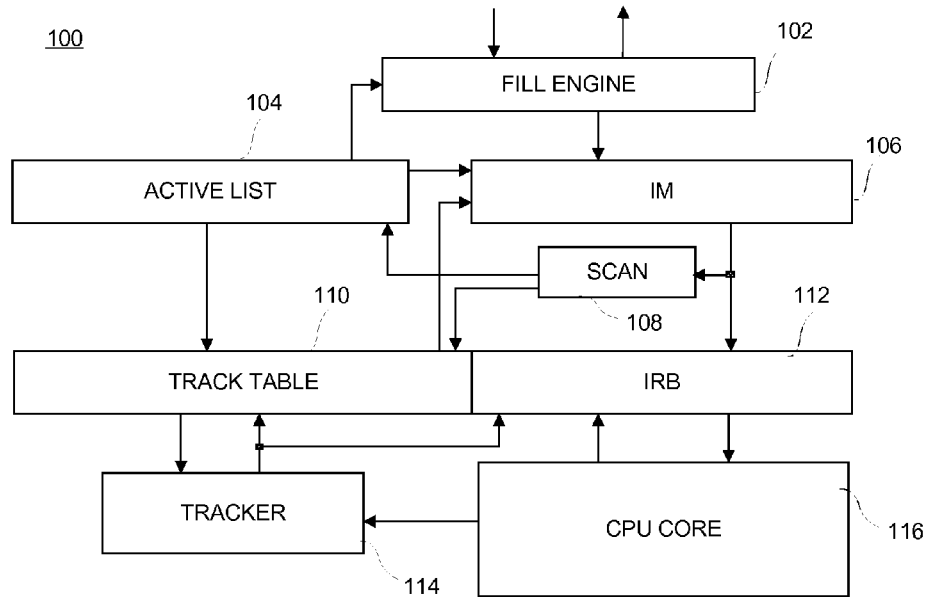
Figure 2A:
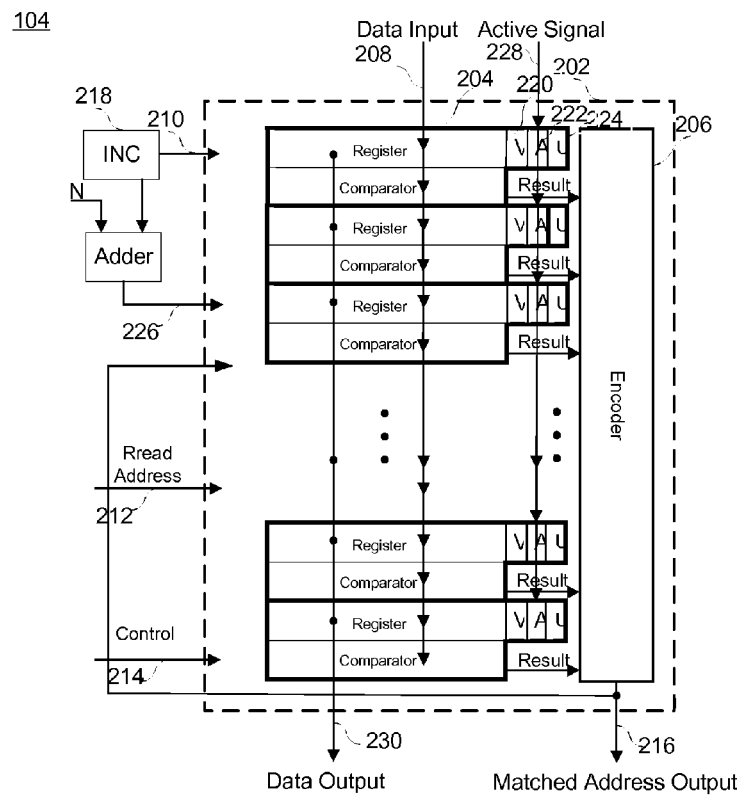
Figure 2B:
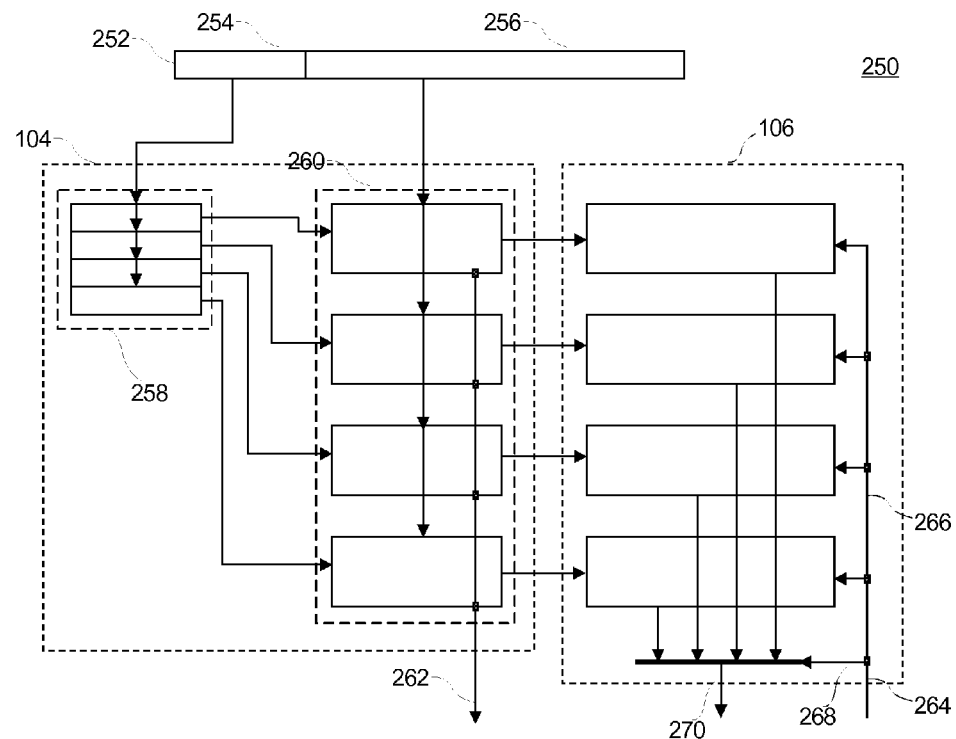
Figure 3A:
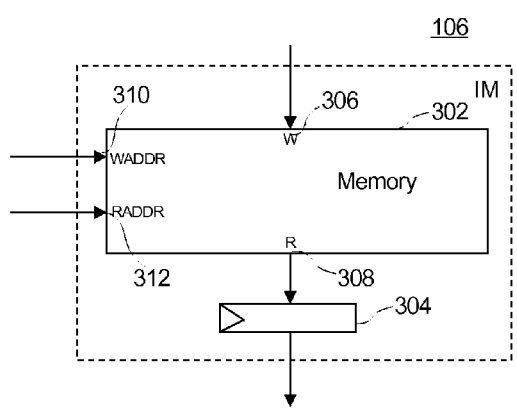
Figure 3B:
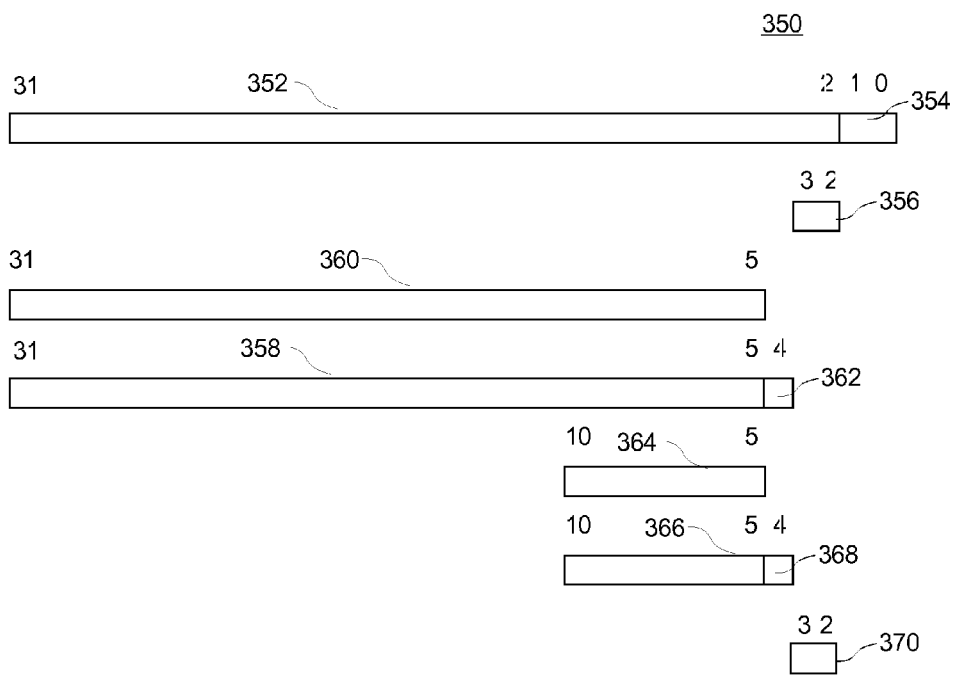
Figure 4A:
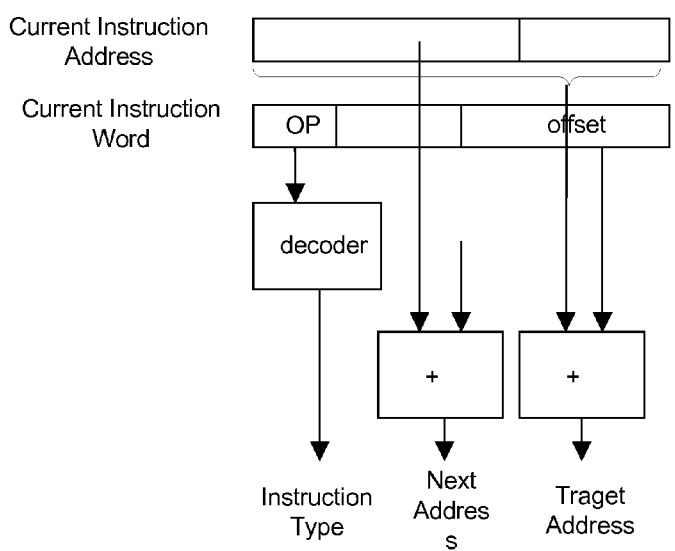
Figure 4B:
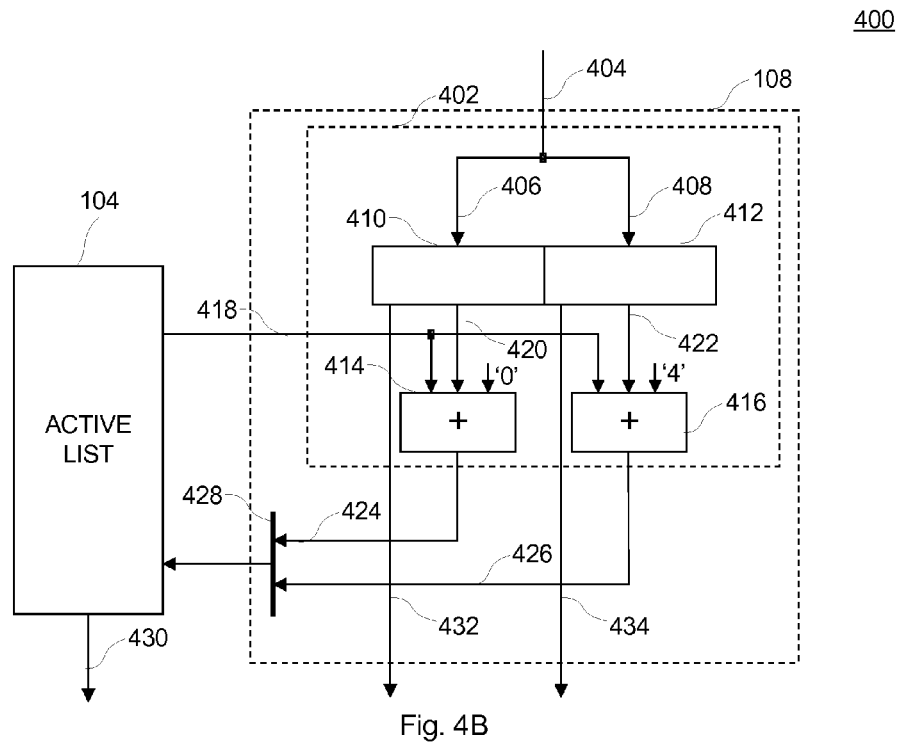
Figure 4C:
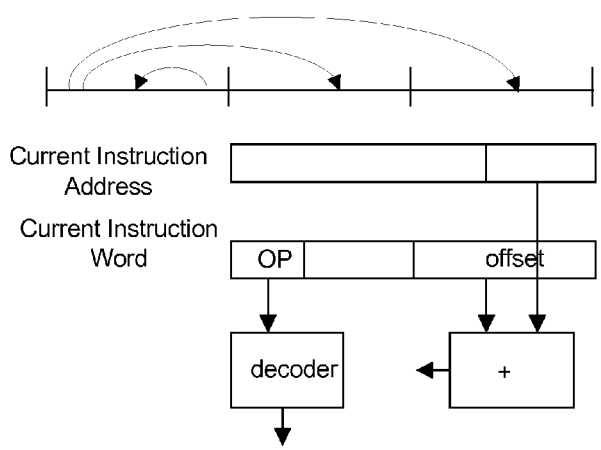
Figure 4D:
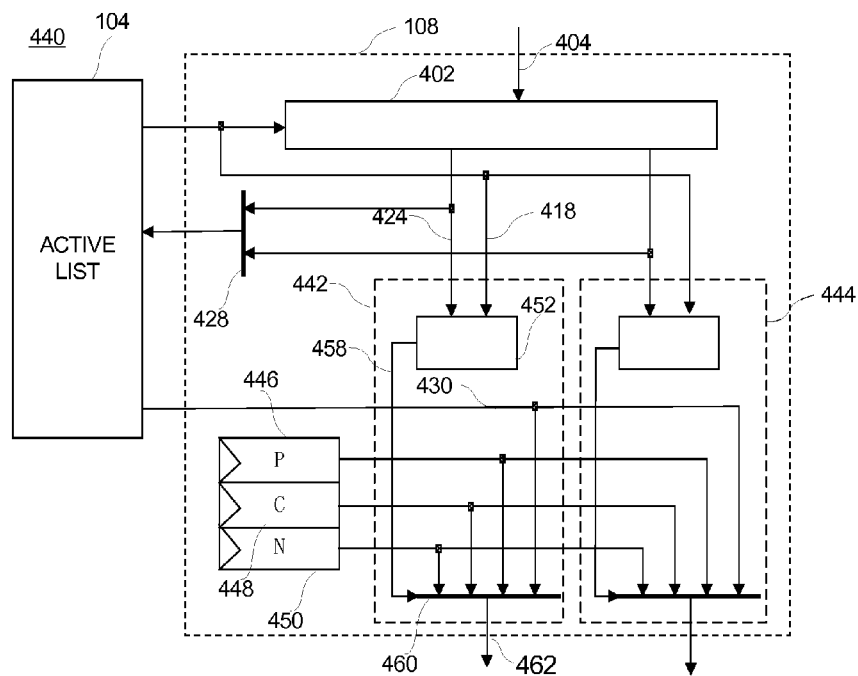
Figure 4E:
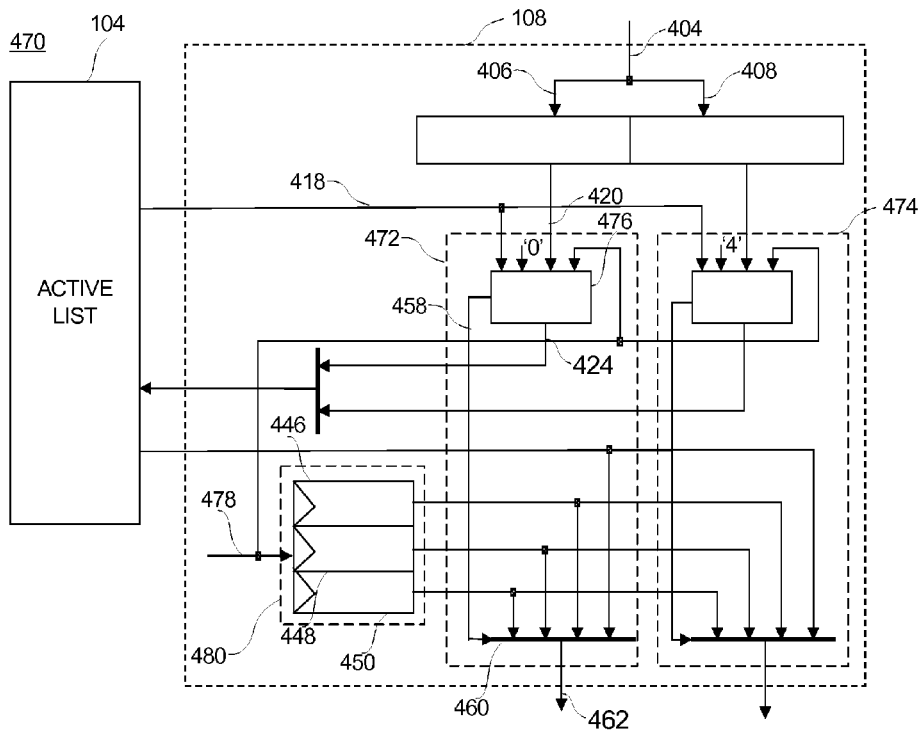
Figure 5A:
Figure 5B:
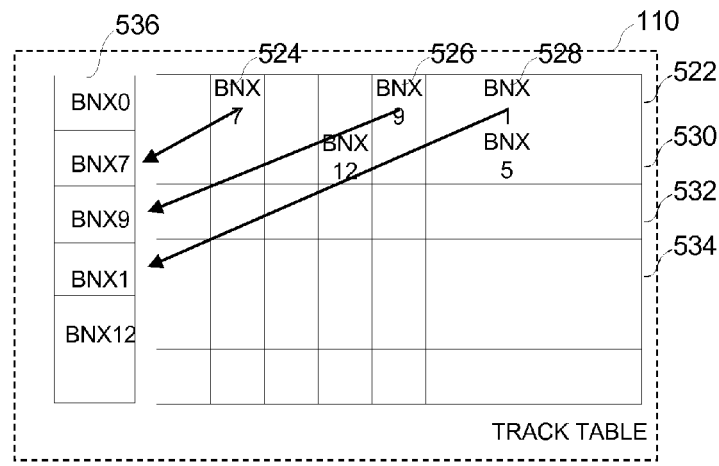
Figure 5C:
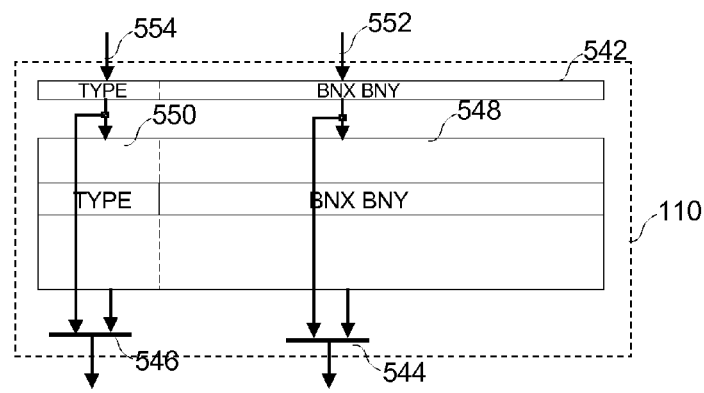
Figure 5D:
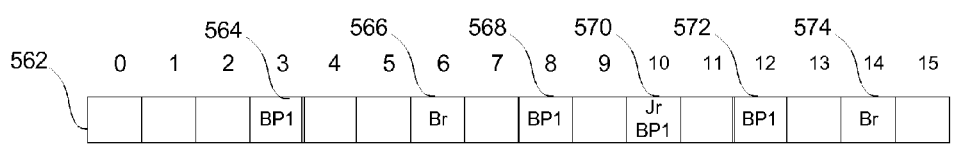
Figure 5E:
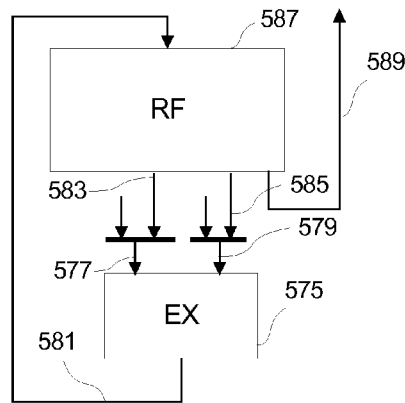
Figure 5F:
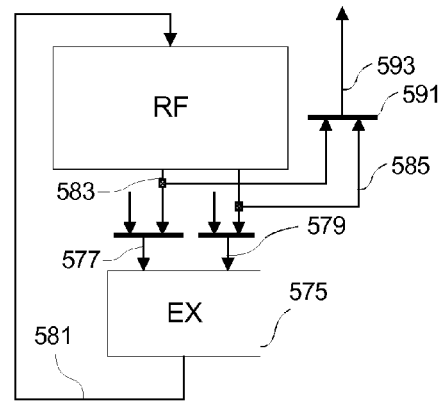
Figure 5G:
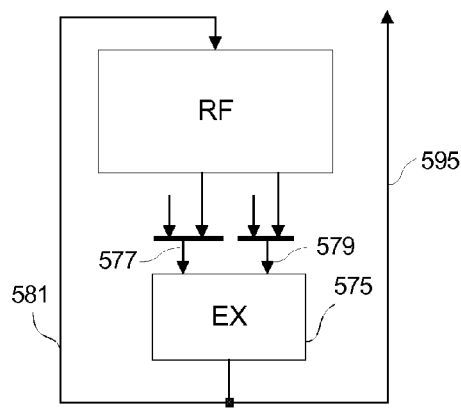
Figure 5H:
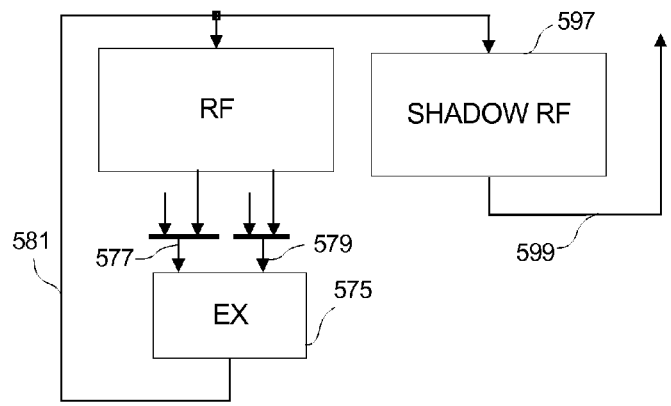
Figure 5I:
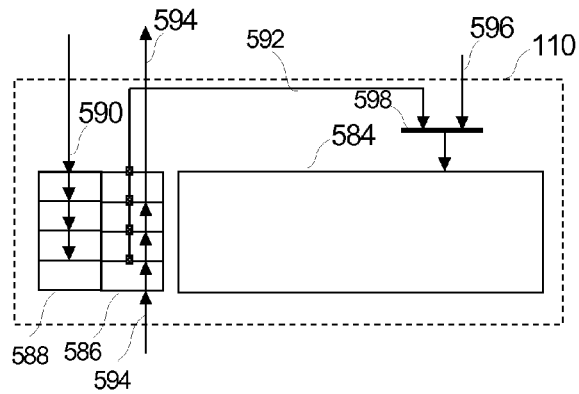
Figure 6A:
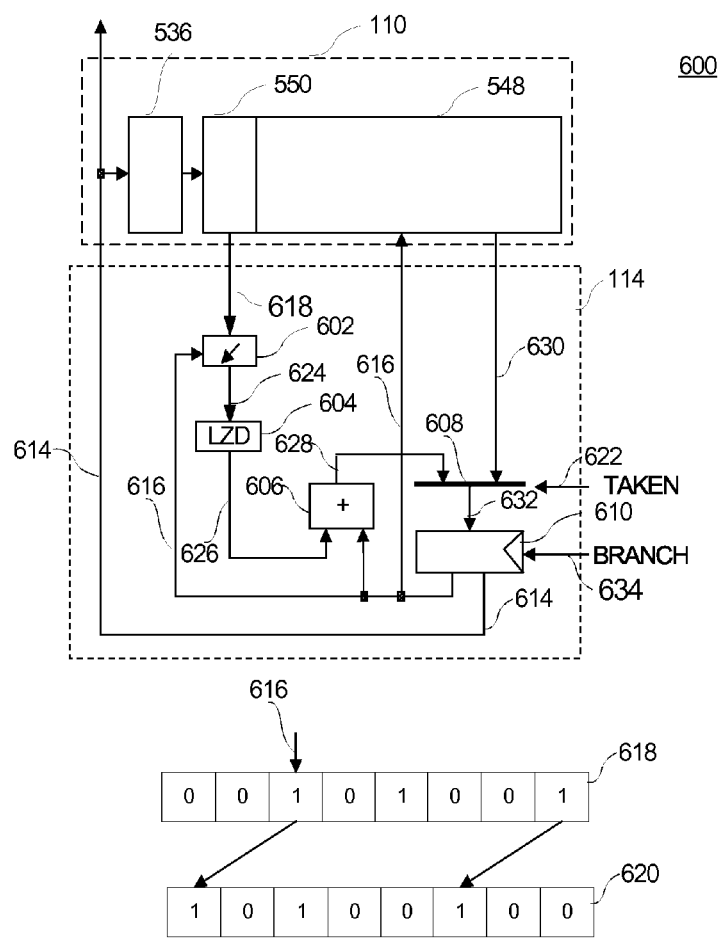
Figure 6B:
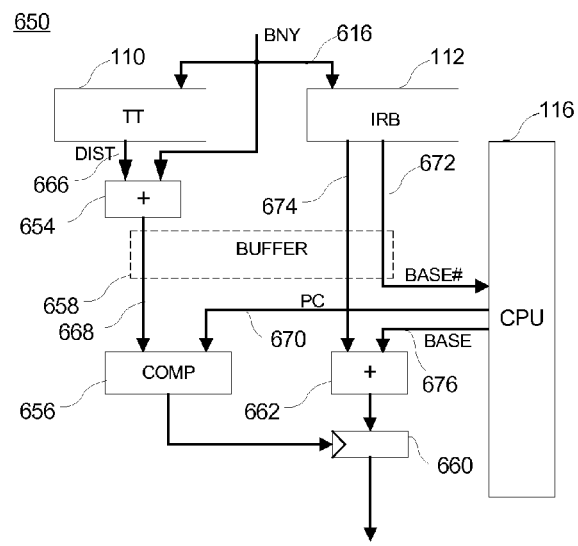
Figure 7A:
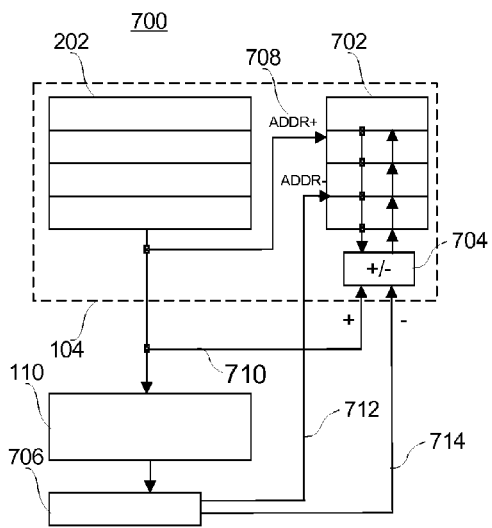
Figure 7B:
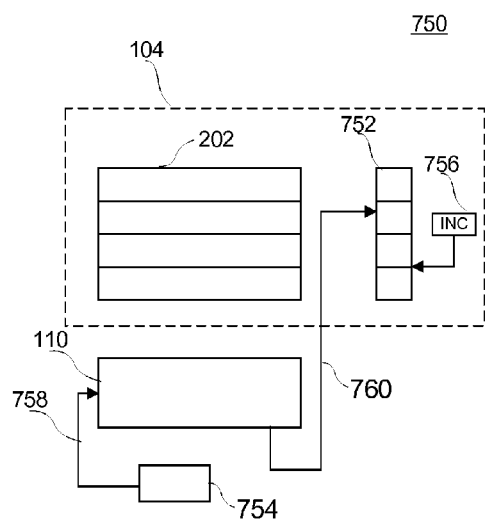
Figure 8A:
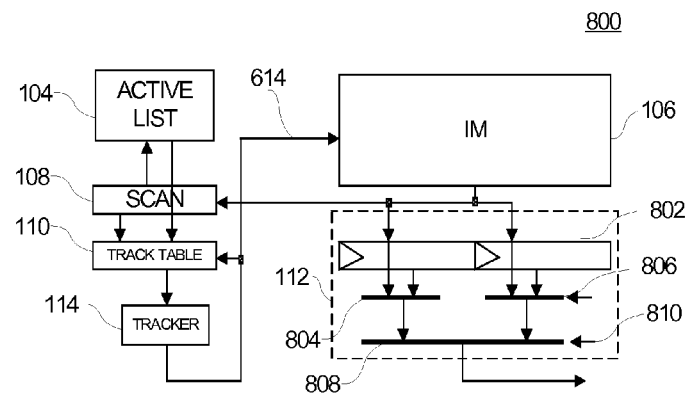
Figure 8B:
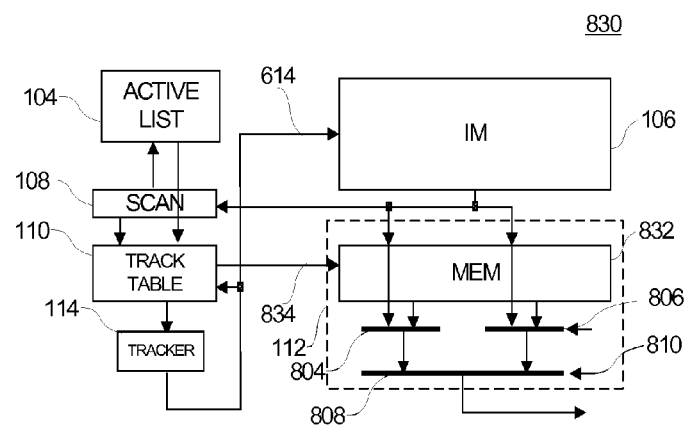
Figure 8C:
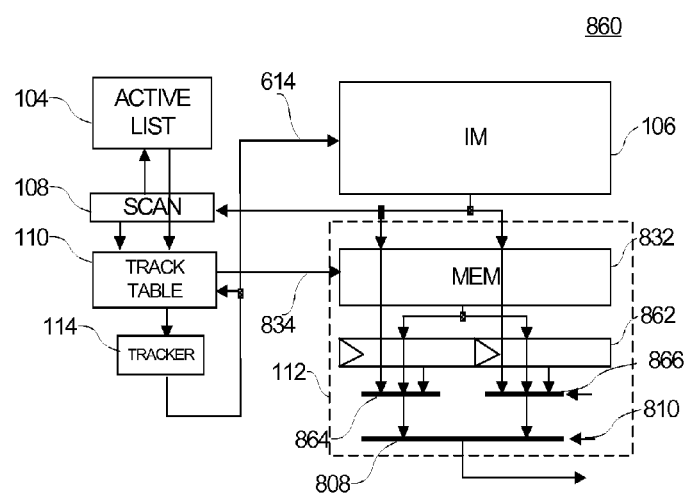
Figure 9A:
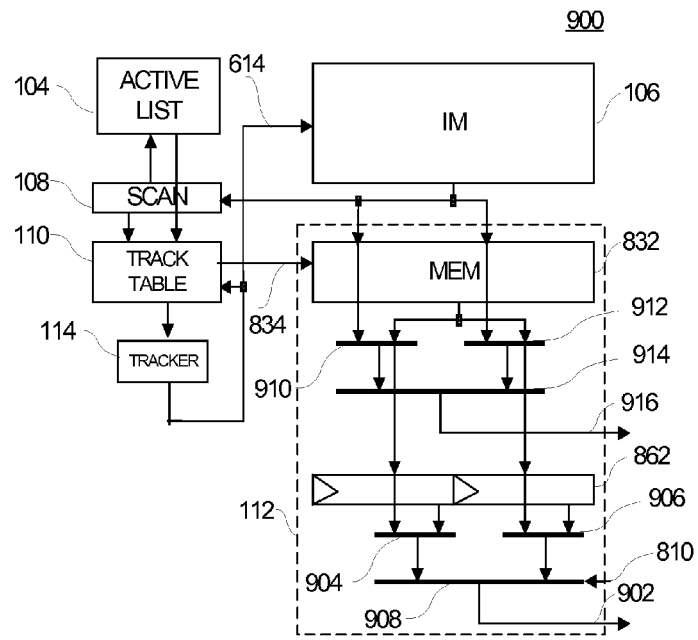
Figure 9B:
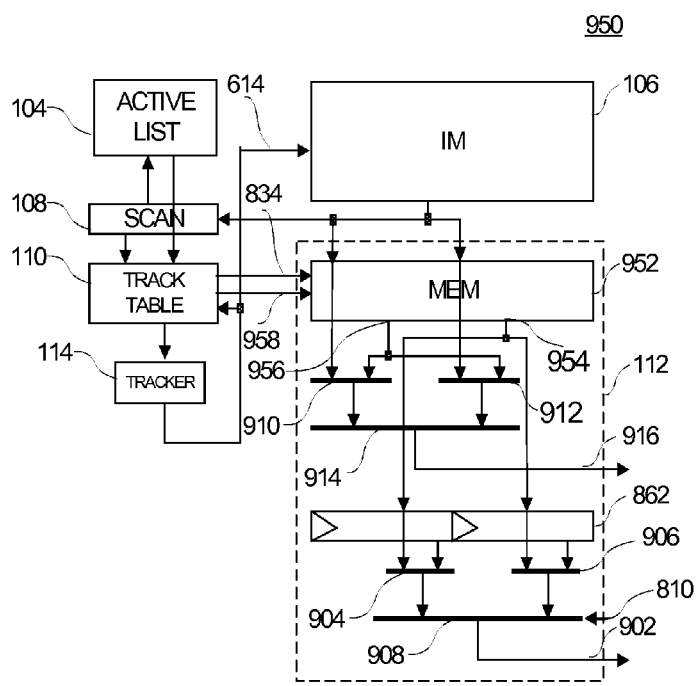
Figure 10:
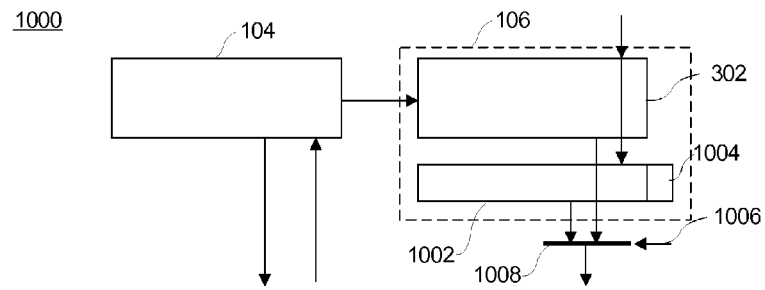
Figure 11A:
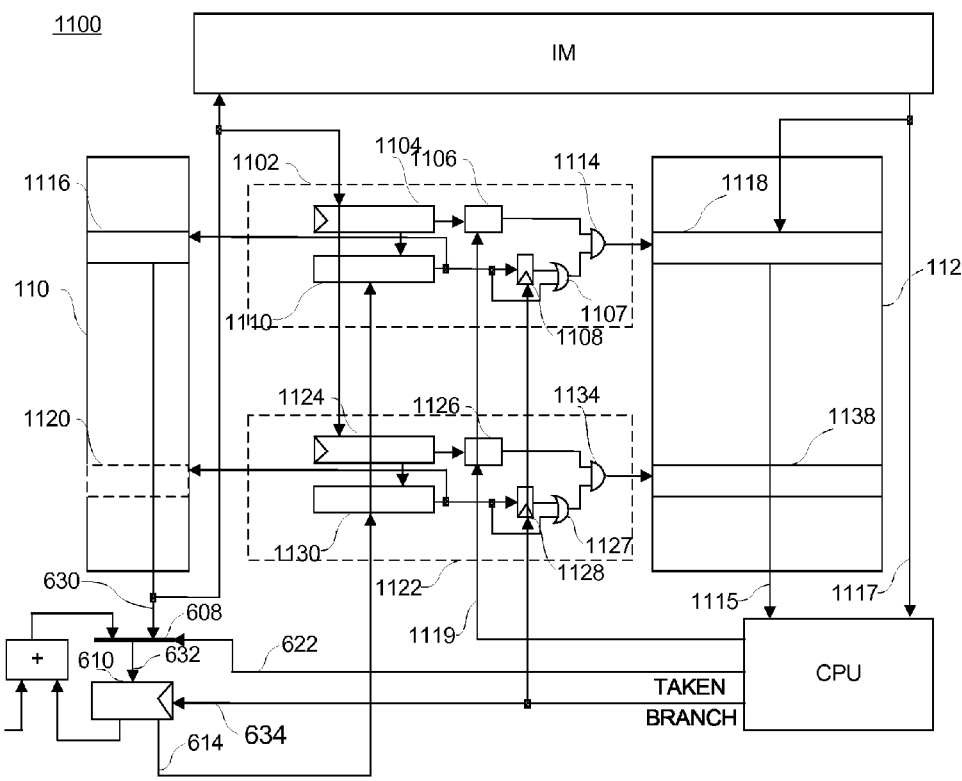
Figure 11B:
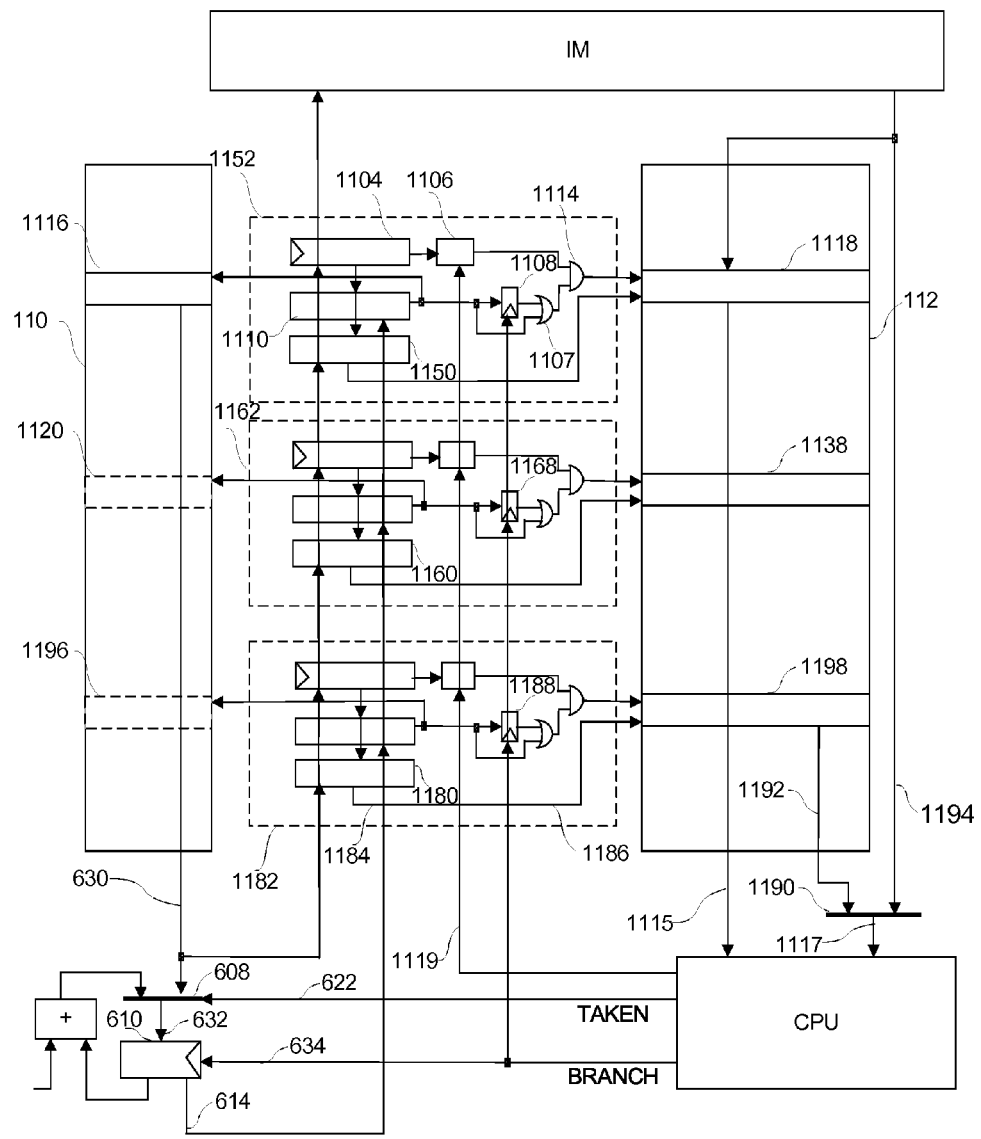
Figure 12A:
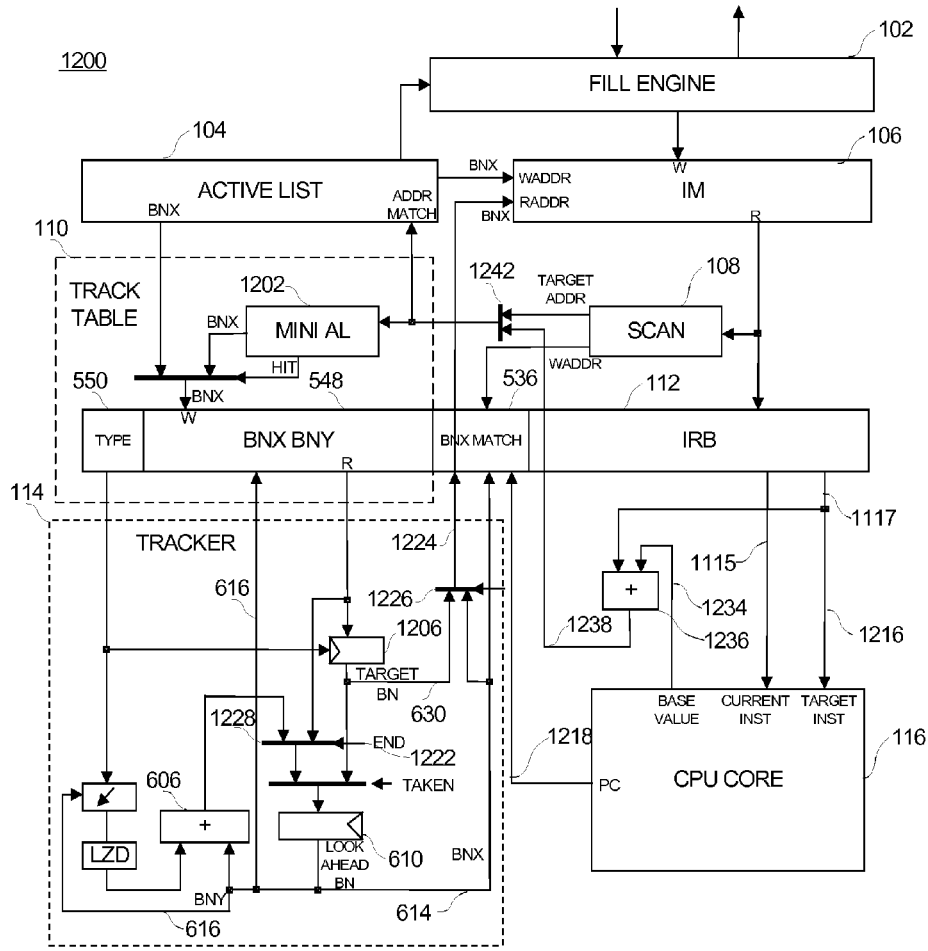
Figure 12B:
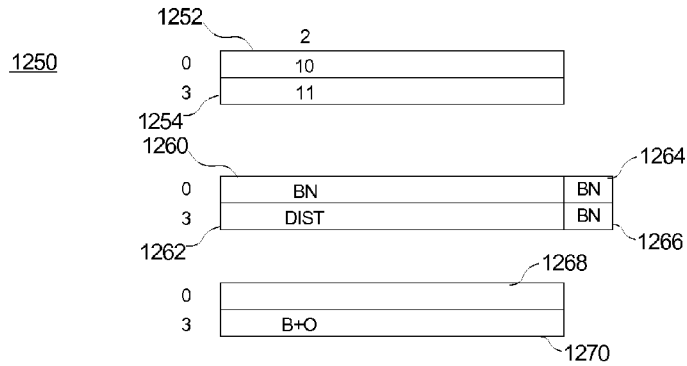

FIG. 1 illustrates an exemplary instruction prefetching processor environment incorporating certain aspects of the present invention;

FIG. 2A illustrates an exemplary active list consistent with the disclosed embodiments;

FIG. 2B illustrates another exemplary active list consistent with the disclosed embodiments;

FIG. 3A illustrates an exemplary instruction memory consistent with the disclosed embodiments;

FIG. 3B illustrates an exemplary relationship among instruction line, instruction block and the corresponding memory unit consistent with the disclosed embodiments;

FIG. 4A illustrates an exemplary scanner consistent with the disclosed embodiments;

FIG. 4B illustrates another exemplary scanner consistent with the disclosed embodiments;

FIG. 4C illustrates an exemplary scanner for filtering generated addresses consistent with the disclosed embodiments;

FIG. 4D illustrates an exemplary the scanner for determining the target address consistent with the disclosed embodiments;

FIG. 4E illustrates a modified exemplary judgment logic consistent with the disclosed embodiments;

FIG. 5A illustrates an exemplary track point format consistent with the disclosed embodiments;

FIG. 5B illustrates an exemplary method to create new tracks using track table consistent with the disclosed embodiments;

FIG. 5C illustrates an exemplary track table consistent with the disclosed embodiments;

FIG. 5D illustrates an exemplary position determined by updating base register instruction with the disclosed embodiments;

FIG. 5E illustrates an exemplary base register value obtained by an extra read port of a register consistent with the disclosed embodiments;

FIG. 5F illustrates an exemplary base register value obtained by a time multiplex mode consistent with the disclosed embodiments;

FIG. 5G illustrates an exemplary base register value obtained by a bypass path consistent with the disclosed embodiments;

FIG. 5H illustrates an exemplary base register value obtained by an extra register file for data prefetching consistent with the disclosed embodiments;

FIG. 5I illustrates an exemplary track table containing a micro mini active list consistent with the disclosed embodiments;

FIG. 6A illustrates movement of the read pointer of the tracker 600 consistent with the disclosed embodiments;

FIG. 6B illustrates an exemplary determination of time point 650 of the indirect branch target address calculation consistent with the disclosed embodiments;

FIG. 7A illustrates an exemplary correlation table consistent with the disclosed embodiments;

FIG. 7B illustrates another exemplary correlation table consistent with the disclosed embodiments;

FIG. 8A illustrates an exemplary providing instruction for the processor core through cooperation of an instruction read buffer, an instruction memory and a track table;

FIG. 8B illustrates an improved exemplary providing instruction for the processor core through cooperation of an instruction read buffer, an instruction memory and a track table;

FIG. 8C illustrates another improved exemplary providing instruction for the processor core through cooperation of an instruction read buffer, an instruction memory and a track table;

FIG. 9A illustrates an exemplary providing the next instruction and the branch target instruction for the processor core consistent with the disclosed embodiments;

FIG. 9B illustrates another exemplary providing the next instruction and the branch target instruction for the processor core consistent with the disclosed embodiments;

FIG. 10 illustrates an exemplary instruction memory including a memory unit for storing the particular program FIG. 11A illustrates an exemplary matching unit used to select the instruction block;

FIG. 11B illustrates another exemplary matching unit used to select the instruction block;

FIG. 12A illustrates an exemplary instruction prefetching consistent with the disclosed embodiments; and FIG. 12B illustrates an exemplary operation for instruction block consistent with the disclosed embodiments.

BEST MODE FOR CARRYING OUT THE INVENTION

Best Mode

FIG. 1 illustrates an exemplary preferred embodiment(s).

MODE FOR THE INVENTION

Mode for Invention

Reference will now be made in detail to exemplary embodiments of the invention, which are illustrated in the accompanying drawings. The same reference numbers may be used throughout the drawings to refer to the same or like parts.

A cache system including a processor core is illustrated in the following detailed description. The technical solutions of the invention may be applied to cache system including any appropriate processor. For example, the processor may be General Processor, central processor unit (CPU), Microprogrammed Control Unit (MCU), Digital Signal Processor (DSP), Graphics Processing Unit (GPU), System on Chip (SOC), Application Specific Integrated Circuit (ASIC), and so on.

FIG. 1 shows an exemplary data prefetching processor environment 100 incorporating certain aspects of the present invention. As shown in FIG. 1, computing environment 100 may include a fill engine 102, an active list 104, a scanner 108, a track table 110, a tracker 114, an instruction memory 106, an instruction read buffer 112 and a processor core 116. It is understood that the various components are listed for illustrative purposes, other components may be included and certain components may be combined or omitted. Further, the various components may be distributed over multiple systems, may be physical or virtual, and may be implemented in hardware (e.g., integrated circuitry), software, or a combination of hardware and software.

The instruction memory 106 and instruction read buffer 112 may include any appropriate storage devices such as register, register file, synchronous RAM (SRAM), dynamic RAM (DRAM), flash memory, hard disk, Solid State Disk (SSD), and any appropriate storage device or new storage device of the future. The instruction memory 106 may function as a cache for the system or a level one cache if other caches exist, and may be separated into a plurality of memory segments called blocks (e.g., memory blocks) for storing data to be accessed by the processor core 116, for example, an instruction in the instruction block.

For processor core 116 to execute an instruction, the processor core 116 first needs to read the instruction from the lowest level memory. As used herein, the level of a memory refers to the closeness of the memory in coupling with a processor core 116. The closer to the processor core, the higher the level. Further, a memory with a higher level is generally faster in speed while smaller in size than a memory with a lower level.

Based on any appropriate address provided by the active list 104, the fill engine 102 may obtain instructions or instruction blocks from the lower level memory and fill them to the instruction memory 106 for the processor core 116 to access them in the future. As used herein, the term "fill"

means to move instruction/data from a lower level memory to a higher level memory, and the term "memory access" means that the processor core 116 reads instruction from the closest memory (i.e., instruction memory 106 or instruction buffer).

The instruction address refers to memory address of the instruction stored in main memory. That is, the instruction can be found in main memory based on this address. The data address refers to memory address of the data stored in main memory. That is, the data can be found in main memory based on this address. For simplicity, it is assumed that virtual address equals physical address. For situations that address mapping is required, the described method of the invention could be applied. Entries in the active list 104 map one-to-one relationship with memory lines stored in the instruction memory 106. Each entry in the active list 104 stores one matching pair with one instruction line address and one line number (LN), indicating that the instruction line corresponding to the instruction line address is stored in the corresponding memory line in the instruction memory 106. As used herein, the LN refers to the location in the instruction memory 106 corresponding to the memory line. The branch target instruction address examined and calculated by the scanner 108 matches with the instruction line address stored in the active list 104 to determine whether the branch target instruction is stored in the instruction memory 106. If the instruction line corresponding to the branch target information is not yet filled to the instruction memory 106, the instruction line is filled to the instruction memory 106 and a matching pair with appropriate instruction line address and LN is created in the active list 104. As used herein, the described matching operation is performed to compare two values. If the comparison result is 'equal', there is a match. Otherwise, there is no match.

As used herein, a branch instruction or a branch point refers to any appropriate instruction type that may make the processor core 116 to change an execution flow (e.g., an instruction is not executed in sequence). The branch instruction or branch source means an instruction that executes a branch operation. A branch source address may refer to the address of the branch instruction itself; branch target may refer to the target instruction being branched to by a branch instruction; a branch target address may refer to the address being branched to if the branch is taken, that is, the instruction address of the branch target instruction. The current instruction may refer to the instruction being executed or obtained currently by the processor core; the current instruction block may refer to the instruction block containing the instruction being executed currently by the processor core.

The scanner 108 may examine every instruction filled to the instruction read buffer 112 from the instruction memory 106 and extract certain information, such as instruction type, instruction source address, and branch offset of the branch instruction, etc. Then target address is calculated based on the extracted information. For example, an instruction type may include unconditional branch instruction, conditional branch instruction, other instructions, etc. The instruction type may also include subcategories of the conditional branch instruction, such as equal branch instruction, greater than branch instruction. Under certain circumstances, unconditional branch may be a special case of conditional branch instruction, with the condition forced to true. In addition, other information may also be included. The scanner 108 may also send the above information and address to other modules, such as the active list 104 and the track table 110.

At least one instruction block including a segment of continuous instructions containing the current instruction is stored in the instruction read buffer 112. Each instruction block has one block number (BNX). The instruction block and instruction lines of the instruction memory 106 may include the same number or different numbers of instructions. If the number of the instructions of the instruction block is the same as the number of memory instruction lines, that is, if the instruction block is equal to the instruction line, BNX and LN are the same. If the memory instruction line includes a plurality of instruction blocks, BNX is less significant bit that is one bit lower than least significant bit (LSB) of LN plus at least one address bit. This address bit indicates the position of the instruction block in the instruction line, that is, the block address in the same line. For example, an instructions line of LN '111' includes two instruction blocks, which BNX of the instruction block that occupied an lower part of the address is '1110'; which BNX of the instruction block that occupied an upper part of the address is '1111'. If multiple instruction blocks are stored in instruction read buffer 112, in addition to the current instruction block stored in the instruction read buffer 112, the next instruction block of the current instruction block in address sequence is also stored in the instruction read buffer 112.

The track table 110 includes a plurality of track points. A track point is a single entry in the track table 110 containing information about at least one instruction, such as information about instruction type, and branch target address, etc. As used herein, a track table address corresponds to an instruction address of the instruction represented by the track point. The track point of a branch instruction includes the branch target track table address corresponding to the branch target instruction address. A plurality of continuous track points corresponding to an instruction block containing a series of contiguous instructions in the instruction read buffer 112 is called a track. The instruction block and the corresponding track are indicated by the same BNX. The track table includes at least one track. The total track points in a track may equal to the total number of entries in one row of track table 110. Other configurations may also be used in track table 110.

The position information of the track point (instruction) in the track table may be represented by the first address (BNX) and the second address (BNY). The first address represents BNX of the instruction corresponding to the track point. The second address represents address offset of the track point (and the corresponding address) in the track (memory block). The first address and the second address correspond to one track point in the track table, that is, the corresponding track point may be obtained from a track table based on the first address (BNX) and the second address (offset). If the type of the track point is a branch instruction, a branch target track may be determined based on the first address (BNX) in the content and a particular track point (or entry) within the target track may be determined by the second address (offset). Thus, a track table is a table, which a branch instruction is represented by a branch source address corresponding to a track entry address and a branch target address corresponding to entry content.

Accordingly, the scanner 108 will extract the instruction information from the instruction stored in the instruction read buffer 112, and store the instruction information to the entry pointed to by the second address of the track. The track is pointed to by the first address corresponding to these instructions in track table 110. If the instruction is a branch instruction, the branch target instruction address of the branch instruction is calculated and sent to active list 104 to perform a matching operation. If the branch target instruction address matches to one of the addresses in the active list 104, the line number (LN) of the memory line having the branch target instruction may be obtained. If the branch target address does not match any address in the active list 104, the branch target address is sent to the fill engine 102, and the memory line is read out from the lower memory. At the same time, the memory line in the active list allocates a memory line number (LN) to the instruction line; the high bit portion of the instruction address is stored into the entry indicated by the line number in the active list 104. The instruction line obtained by fill engine 102 is filled to the memory line indicated by the line number, and the first address generated by the line number and the second address extracted from the instruction address are written into the track list.

There is a one-to-one correspondence between a track in the track table 110 and a memory block in the instruction read buffer 112. Both the track and the memory block are pointed to by the same pointer. Any instruction to be executed by the processor core 116 can be filled to the instruction read buffer 112 before execution. In order to establish a relationship between one track and the next track, after the track point representing the last instruction in each track, an ending point is set to store the first address of the next track (instruction block) being executed in sequence. If the instruction read buffer 112 can store a plurality of instruction blocks, when the current instruction block is being executed, the next instruction block executed in sequence is also fetched into the instruction read buffer to be read and executed by the processor core 116 in the near future. The instruction address of the next instruction block may be calculated with the instruction address of the current instruction block plus the length of the instruction address of the block. The address is sent to active list 104 to perform a matching operation. The obtained instruction block is filled to the instruction block specified by the replacement logic of the instruction read buffer 112. The instruction block and the corresponding track are tagged by BNX obtained by the matching operation. At the same time, the BNX is stored into the ending track point of the current track. The instructions in the next instruction block which are recently stored into the instruction read buffer 112 are scanned by the scanner 108 to extract information. The extracted information is filled to the track pointed to by the BNX as previously described.

The read pointer of the tracker 114 points to the first branch instruction track point in the track table 110, which is located after the current instruction in the track with the current instruction; or the read pointer of the tracker 114 points to the ending track point of the track if the branch instruction track point after the current instruction in the track does not exist. The read pointer of the tracker 114 is composed by the first address pointer and the second address pointer. The value of the first address pointer is the instruction block number containing the current instruction, and the second pointer points to the first branch instruction track point or the ending track point after the current instruction in the track. The first address of the branch target in the content of the track point pointed to by the read pointer is used to perform an addressing operation for instruction memory 106. The instruction block containing the branch target instruction is read out and sent to the scanner 108 to examine. Scanner 108 may examine instruction block sent from the instruction memory 106. The corresponding instruction information is extracted, and the branch target address of the branch instruction is calculated and temporarily stored. The replacement logic of the instruction read buffer 112 may specify an instruction block and the corresponding track to be filled to the branch target instruction block.

If branch instruction pointed to by the tracker 114 does not take a branch, the read pointer of the tracker 114 points to the first branch instruction track point after the current instruction in the track containing the current instruction in the track table 110; or the read pointer of the tracker 114 points to the ending track point of the track when the branch instruction track point after the current instruction in the track does not exist. The processor core read out the instruction executed in sequence after the branch instruction.

If branch instruction pointed to by the tracker 114 takes a branch, the branch target instruction block read out from the instruction memory 106 is stored in the instruction block specified by the buffer replacement logic of the instruction read buffer 112, and new track information produced by scanner 108 is filled to the corresponding track in the track table 110. The first address and the second address of the branch target becomes the new address pointer of the tracker, pointing to the track point corresponding to the branch target in the track table. The new tracker address pointer also points to the recently filled branch instruction block, making it the new current instruction block. The processor core selects the required instruction by instruction address from the current instruction block. Then, the read pointer of the tracker 114 points to the first branch instruction track point after the current instruction in the track containing the current instruction in the track table 110; or the read pointer of the tracker 114 points to the ending track point of the track when the branch instruction track point after the current instruction in the track does not exist.

If tracker 114 points to the ending point of the track in the track, the read pointer of tracker 114 is updated to the position content value of the last track point, that is, the pointer points to the first track point of the next track, thereby pointing to the new current instruction block. Then, the read pointer of the tracker 114 points to the first branch instruction track point after the current instruction in the track containing the current instruction in the track table 110; or the read pointer of the tracker 114 points to the ending track point of the track when the branch instruction track point after the current instruction in the track does not exist. The above described procedure is repeated in sequence. The instruction may be filled to the instruction read buffer 112 before it is executed by the processor core 116. The processor core 116 may fetch the instruction without waiting, therefore improving the performance of the processor.

FIG. 2A illustrates an exemplary active list consistent with the disclosed embodiments. As shown in FIG. 2A, the main body portion of active list may include a data/address bidirectional addressing unit 202.

The data/address bidirectional addressing unit 202 may include a plurality of entries 204. Each entry 204 includes a register, a flag bit 220 (i.e., V bit), a flag bit 222 (i.e., A bit) a flag bit 224 (i.e., U bit), and a comparator. Result from the comparator may be provided to encoder 206 to generate a matching entry number, that is, block number. Control 214 may be used to control read/write state. V (valid) bit of each entry 220 may be initiated as '0', and A (Active) bit for each entry 222 may be written by an active signal on input line 228.

A write pointer 210 may point to an entry in data/address bidirectional addressing unit, and the pointer is generated by a wrap-around increment unit 218. The maximum number generated by wrap-around increment unit 218 is the same as a total number of entries. After reaching the maximum number, the next number is generated from wrap-around increment unit 218 by increasing one to start from '0', and continues the increment until reaching the maximum number again.

When the write pointer 210 points to the current entry, V bit and A bit of the current entry may be checked. If both values of V bit and A bit are '0', the current entry is available for writing. After the write operation is completed, wrap-around increment unit 218 may increase the pointer by one (1) to point to next entry. However, if either of V bit and A bit is not '0', the current entry is not available for writing, wrap-around increment unit 218 may increase the pointer by one (1) to point to next entry, and the next entry is checked for availability for writing.

During writing, the data which is written through inputted block address data input 208 is compared with the content of the register of each entry. If there is a match, the entry number is outputted by matched address output 216, and the write operation is not performed. If there is no match, the inputted data is written into the entry pointed to by the address pointer 210, and the V bit of the same entry is set to '0'. The entry number is provided onto match address output 216, and the address pointer 210 points to the next entry. For reading, the content of the entry pointed to by the read address 212 is read out by data output 230. The entry number is outputted by matched address output 216, and the V bit of the selected entry is set to '1'.

U bit of an entry 224 may be used to indicate usage status. When write pointer 210 points to an entry 204, the U bit of the pointed entry 224 is set to '0'. When an entry 204 is read, the U bit of the read entry 224 is set to '1'. Further, when a write pointer 210 generated by wrap-around increment unit 218 points to a new entry, the U bit of the new entry is checked first. If the U bit is '0', the new entry is available for replacement, and write pointer 210 stays on the new entry for possible data to be written. However, if the U bit is '1', write pointer 210 further points to the next entry. Optionally, a window pointer 226 may be used to set the U bit of the pointed entry to '0'. The entry pointed to by the window pointer 226 is N entries ahead of write pointer 210 (N is an integer). The value of window pointer 216 may be obtained by adding value N to the write pointer 210. The N entries between write pointer 210 and window pointer 226 are considered as a window. The unused entries may be replaced during write pointer 210 moves on to N entries. The replacing rate of the entries can be changed by changing the size of window (i.e., changing the value of N). Alternatively, the U bit may include more than one bits thus becoming the U bits. The U bits may be cleared by write pointer 210 or window (clear) pointer 226, and the U bits increase '1' after each reading. Before writing operation, the U bits of a current entry are compared to a predetermined number. If the value of U bits is less than the predetermined value, the current entry is available for replacement. If the value of U bits is greater than or equal to the predetermined value, write pointer 210 moves to the next entry.

FIG. 2 B illustrates another exemplary active list 250 consistent with the disclosed embodiments. As shown in FIG. 2B, a LN may be obtained when the instruction line address matches with one of the line address stored in the active list. In the present embodiment, the matching operation is divided into two parts, i.e. active list 104 is composed of two parts. The first part 258 of the active list 104 is used to match a high bit portion 254 of the instruction line address 252, and the second part 260 is used to match a low bit portion 256 of the instruction line address 252. Both parts are constituted by the content-addressable memory.

The number of entries of the first part 258 is equal to the number of memory blocks of the second part 260, and there is a one-to-one correspondence between two parts. Each memory block of the second part 260 includes a number of entries, and each entry corresponds to an instruction line. The high bit portion of the line address is stored in the first part 258 of the active list, and the low bit portion of the line address is stored in the second part 260 of the active list. When the complete line address is the same as an input line address, there is a match. In addition, if the matching entry number outputted by the first part 258 and the matching entry number outputted by the second part 260 are spliced together, the line number corresponding to the instruction line address may be obtained.

In the present embodiment, it is assumed that the first part 258 of the active list includes four entries; the second part 260 of the active list includes four memory blocks, and each of which corresponds to an entry in the first part 258. It is the same when the first part 258 of the active list includes different number of entries. Further, as used herein, there is a one-to-one correspondence between the memory block in the second part 260 of the active list and the memory block in the instruction read buffer 112. Similar correspondence exists between entries in the corresponding memory blocks.

When the scanner 108 calculates the branch target address or the next instruction block address, the corresponding line address 252 is sent to the active list 104 to perform a matching operation. At the beginning, a matching operation is performed between the high bit portion 254 of the line address and the high bit portion of the line address stored in the first part 258 of the active list. If there is no match in the first part 258, it indicates that the instruction line corresponding to the line address is not yet stored in the instruction memory 106. Therefore, an entry is allocated based on the replacement algorithm in FIG. 2A, and an entry is also allocated in the memory block corresponding to the entry in the second part 260 of the active list. The high portion 254 of the input line address is stored in the entry in the first part 258 of the active list, and the low portion 256 of the input line address is stored in the entry in the second part 260 of the active list. The output line number 262 is sent to the track table 110. Meanwhile, the line address is sent to the fill engine 102 to perform an instruction line prefetching operation. The prefetched instruction line is then stored in the memory line corresponding to the entry in the second part 260 of the active list in the instruction memory 106 to complete the filling instruction.

If there is a match in the first part 258, the low bit portion of the line address is sent to the memory block in the second part 260 of the active list to perform a matching operation, wherein the memory block corresponds to the matched entry in the first part. If there is no match in the second part 260 of the active list, it indicates that the instruction line corresponding to the line address is not yet stored in the instruction memory 106. Therefore, an entry is allocated based on the replacement algorithm in FIG. 2A, and the low bit portion 256 of the input line address is stored in the entry in the second part 260 of the active list. The output line number 262 is sent to track table 110. Meanwhile, the line address is sent to the fill engine 102 to perform an instruction line prefetching operation. The prefetched instruction line is then stored in the memory line corresponding to the entry in the second part 260 in the instruction memory 106 to complete the filling instruction. If there is also a match in the second part 260, it indicates that the instruction line corresponding to the line address is already stored in the instruction memory 106. Therefore, the line number 262 is directly outputted to track table 110.

As used herein, when the read pointer of the tracker 114 points to a branch track point, the branch target instruction block number of the branch track point (the first address) is read out. And the line number 264 corresponding to the block number is sent to the instruction memory 106. The line number part 266 in the line number 264 corresponding to the second part 260 of the active list is used to perform an addressing operation from various memory blocks of the instruction memory 106 to select the corresponding instruction line. The line number part 268 in the line number 264 corresponding to the first part 258 of the active list is used to select the corresponding instruction line 270 from the instruction lines outputted by various memory blocks. The instruction line 270 is the instruction line corresponding to the input line number 264.

In specific implementation, at the beginning, the line number part 268 in the line number 264 corresponding to the first part 258 of the active list enables the corresponding memory block in the instruction memory 106, and then the line number part 266 in the line number 264 corresponding to the second part 260 of the active list selects instruction line 270 from the memory block. There is no need to access all the memory blocks in the instruction memory 106 at the same time, thus reducing power consumption.

For simplicity, active lists described in the following embodiments are the same as the active list in FIG. 2A. It is noted that if the active lists in these embodiments are replaced by the active list in FIG. 2B, the same function can also be implemented.

Returning to FIG. 1, when there is no match for the address sent from the scanner 108 in the active list 104, the address is sent to the fill engine 102 to wait for obtaining the instruction line from the lower level memory corresponding to the address. At the same time, an entry is allocated in the active list 104 to store the line address corresponding to the instruction line. Therefore a block number/address pair is formed. As used herein, the line address of the instruction line is a start instruction address of the instruction line. The instruction memory may be logically divided into a plurality of memory blocks, and each memory block corresponding to an entry in the active list may store the instruction line corresponding to the line address in the entry. When the address line corresponding to the line instruction is fetched, the fill engine 102 may send it to the instruction memory 106 and write it to the memory block of the block number index corresponding to the line address.

FIG. 3A illustrates an exemplary instruction memory consistent with the disclosed embodiments. As shown in FIG. 3A, the instruction memory is composed of the instruction memory unit 302 and the output register 304. When the fill engine 102 performs a write operation for the instruction memory unit 302, the line number from the active list 104 is sent to the write address port 310 to index the written memory line, and the instruction line is written to the memory line through the write port 306. The first address (i.e., the block number) of the branch target track point stored in the branch track point pointed to by the read pointer of the tracker 114 is sent to the read address port of the instruction memory unit 302 as a read address, and one instruction block corresponding to the instruction line of the memory line is read out from read port 308. The described instruction block is the instruction block containing the instruction corresponding to the branch target track point. The instruction block is stored in the output register 304 to be accessed by the processor core 116. At this time, the instruction memory unit 302 may be indexed by other block number sent from the tracker 114. The instruction memory unit 302 may perform an addressing operation to locate the corresponding instruction block based on the new address (which may be a random address), and the output register 304 may perform an addressing operation based on the sequential addresses to sequentially output the instructions stored in the instruction block. For the addressing address sent by the processor core 116, the address of the next instruction is always the next address of the current instruction address in sequence except when a branch is taken. Therefore, the structure in FIG. 3A (a single-port memory with the output register that may accommodate an instruction block) may simultaneously output the branch target instruction and the next instruction executed in sequence, thus implementing the function of the dual-port memory.

As used herein, an instruction line includes at least one instruction block. Therefore, the capacity of the memory line in the instruction memory unit 302 may also be larger than the capacity of the output register 304, whereas the capacity of the memory block in the instruction read buffer 112 is the same as the capacity of the output register 304.

FIG. 3B illustrates an exemplary relationship 350 among instruction line, instruction block and the corresponding memory unit consistent with the disclosed embodiments. As shown in FIG. 3B, the length of the instruction address 352 is 32, that is, the most bit is the 31st position and the LSB is position zero, with the address of each instruction corresponding to one byte. Therefore, the lowest two bits 354 (i.e., 1, 0) of instruction address 352 correspond to 4 bytes of an instruction word. It is assumed that an instruction block includes four instructions. Therefore, offset 356 indicates the position of the corresponding instruction in the instruction block. Thus, the high bit portion 358 of the instruction address (i.e., the 31st bit to the 4th bit) indicates a start address of the instruction block, that is, the instruction block address.

For illustrative purposes, in the present embodiment, an instruction line corresponds to the two consecutive instruction blocks. Thus, the high bit portion (i.e., the 31st bit to the 5th bit) of the instruction block address obtained by removing LSB 362 of the instruction block address 358 is instruction line address 360. The LSB 362 of instruction block address 358 indicates that the instruction block locates in the position of the corresponding instruction line.

As used herein, the mapping relationships are created between the instruction block address and the block number (BNX), between the instruction line address and the line number (LNX). In the present embodiment, if the active list accommodates 64 line numbers, the total number of the corresponding line number 364 is 6, i.e., the 5th bit to the 10th bit in line number 364. It is noted that the value of the line number 364 may not be equal to the value of the 5th bit to the 10th bit in the instruction address 352, and the 64 instruction lines correspond to 128 instruction blocks. Therefore the total bits of the corresponding block number 366 is 7 (i.e., the 10th bit to the 4th bit of instruction block number 366, wherein the value of the 10th bit to the 5th bit is equal to the value of the line number 364). As used herein, because the two instruction block in an instruction line is continuous, the two blocks (i.e., the first address) corresponding to one line number is also continuous. Thus, the value of the LSB 368 of the block number 366 is the LSB 362 of the corresponding instruction block address 358.

Similarly, the second address 370 with the same value of these two is the block offset 356 of the instruction in the instruction block.

Thus, the instruction block outputted from the instruction memory 106 every time may be filled to one memory block in the instruction read buffer 112. Therefore, when the instruction read buffer 112 includes an instruction block, it does not need to include the entire instruction line of the instruction block. That is, instruction read buffer 112 may include two instruction blocks corresponding to the same instruction line, or include only one instruction block of them. Therefore, storage space has more flexibility. Further, the capacity of active list 104 is reduced to ½ of the original capacity. The same pattern may be implemented for an instruction line containing more instruction blocks.

Returning to FIG. 1, the scanner 108 may examine each instruction sent from the instruction memory 106 and extract some information, such as instruction type, instruction address, and branch target information of branch instruction. For example, the instruction type may include conditional branch instruction, unconditional branch instruction and other instructions. Specifically, unconditional branch instruction may be a special case of the conditional branch instruction, that is, condition is always true. Therefore, the instruction type may be divided into the branch instruction, and other instructions. Branch source address may refer to the branch instruction's own address. The branch target address may refer to the address transferred into when a branch instruction branches successfully. In addition, other information may be included.

As used herein, the scanner 108 examines all the instructions outputted from the instruction memory 106 and extracts the instruction type to output to the track table 110, thereby calculating the branch target address of the branch instruction. The target address may be obtained by the start address of the instruction block containing the branch instruction plus the offset of the branch instruction, and coupled with the distance from the branch to the target instruction. The high bit portion of the target address (e.g., the instruction block address 358 in FIG. 3A) is used to match the contents of active list 104 to obtain the line number of the track point corresponding to the branch target instruction, and form the first address or block number by splicing the LSB of the block address (e.g., the LSB 362 of the instruction block address 358 in FIG. 3A). The low bit portion of the target address (e.g., the block offset 354 in FIG. 3A) is the second address of the track point corresponding to the branch target instruction, i.e., the line offset of the branch target instruction.

For the end track point, the instruction block address of the next instruction block is obtained by adding the length of the instruction block to the instruction block address. Then the next instruction block address is used as the target address to perform a matching operation following the same way.

If there is a match in the high bit portion of the target address in the active list 104, the active list 104 outputs the block number corresponding to the high bit address to track table 110; if there is no match in the high bit portion of the target address in the active list 104, the active list 104 sends the value by bus 144 to fill engine 102 to perform a filling operation. Simultaneously, a block number is assigned to the high bit address and outputted to the track table 110.

As used herein, the scanner 108 parses the instruction block outputted from the instruction memory 106 and judges whether the branch instruction is included in the instruction block. If the branch instruction is included in the instruction block, the target address of the branch instruction is calculated to generate an address. Specifically, the scanner 108 parses the instruction block by the following procedure: the scanner 108 obtains OP (instruction type information, labeling the instruction as a branch instruction or a non-branch instruction) in the instruction block to obtain the information whether a branch instruction is included. If it is determined (or parsed) that the instruction block includes a branch instruction, the target address of the branch instruction is calculated.

Further, the scanner 108 may obtain the address of the instruction block outputted from the instruction memory 106, and add an offset to the address of the instruction block to generate the address. As used herein, the offset is a fixed value. Preferably, the offset is an address offset of two adjacent instruction blocks. Thereby, the address generated by the scanner 108 is the instruction block of the adjacent address of the instruction block, particularly the instruction block of the next address of the instruction block.

Thus, the address generated by the scanner 108 includes: the scanner 108 parses the instruction block outputted from the instruction memory 106. If the branch instruction is included in the instruction block, the target address of the branch instruction is calculated to generate an address (wherein the term "an" refers to one, some or one part); and the address of the instruction block obtained by the scanner 108 adds an offset to the address in the instruction block to generate another address.

Next, specific implementations are provided for generating addresses by the scanner. FIG. 4A illustrates an exemplary scanner consistent with the disclosed embodiments. As shown in FIG. 4A, the scanner generates the address by the following manner: the scanner determines whether the current instruction is a branch instruction or a non-branch instruction by the decoder. If it is determined that the instruction is a branch instruction, the current instruction address adds branch offset by an adder to obtain the target address of the branch instruction; the scanner adds the current instruction block address to the block offset (i.e., the address deviation of the adjacent two information blocks) by an adder to obtain the address of the instruction block adjacent to the current instruction block.

FIG. 4B illustrates another exemplary scanner 400 consistent with the disclosed embodiments. As shown in FIG. 4B, the scanner 108 examines the received instruction block 404 and extracts the instruction type of each instruction, thereby calculating the branch target address. For illustrative purposes, as used herein, an instruction block includes two instructions, for example, the instruction block 404 includes instruction 406 (corresponding to the lower address of the instruction) and instruction 408 (corresponding to the higher address of the instruction). An instruction block containing more instructions is also similar. The main body portion 402 of the scanner 108 includes a decoder 410, a decoder 412, an adder 414, and an adder 416. The decoder 410 and the adder 414 correspond to the instruction 406. The decoder 412 and the adder 416 correspond to the instruction 408. The decoder decodes an input instruction and outputs instruction type (for example, instruction type 432 and instruction type 434) and the branch offset (such as branch offset 420 and branch offset 422). The outputted instruction type is sent directly to the track table 110 and written into the corresponding position, whereas the outputted branch offset corresponding to the branch instruction is sent to the adder to perform an addition operation. It is assumed that both instruction 406 and instruction 408 are branch instructions. For example, the inputs of the adder 414 include the branch offset 420, the current instruction block address 418 and the constant '0'. As used herein, the branch target address of the branch instruction is equal to the sum of the block address of the instruction block containing the instruction, the offset of the instruction in the instruction block, and the branch offset. The branch instruction 406 is the first instruction in the instruction block, and the offset in the instruction block is '0'. Therefore, the output obtained from adder 414 by adding three inputs together is the target address 424 of the corresponding branch instruction 406. Similarly, the branch instruction 408 is the second instruction in the instruction block. As shown in FIG. 3B, the address interval between the two adjacent instructions is '4'. Therefore, the inputs of the adder 416 include branch offset 422, the current instruction block address 418 and the constant '4'. The output of the adder 416 is the branch target address 426 corresponding to the branch instruction 408. Branch target address 424 and branch target address 426 are sent to the selector 428. After selection, the selected address is sequentially sent to the active list 104 to perform a matching operation, obtaining the corresponding block number. The obtained block number is sent to the track table 110 by bus 430 and sequentially written to the corresponding position.

As used herein, the address 418 of the instruction block is read out from the active list 104 and sent directly to the adder of the scanner 108. The address register added in the scanner 108 is used to store the current instruction block address, such that active list 104 does not need to send the instruction block address in real time.

The scanner 108 scans the output instruction from the instruction memory 106 to obtain the instruction type and the branch target address of the branch instruction. A simple judgment may be used to determine whether the branch target is located in the instruction block or adjacent instruction block (these instruction block numbers are known) containing the branch instruction (branch source), thereby reducing the matching times of the active list 104.

When the address of an instruction block is obtained, each instruction address in the instruction block and the length of the instruction block (i.e., the address deviation between the first instruction and the last instruction) may be easily obtained. Whether the instruction address (as used herein, that is, the generated address, or further refers to the branch target address and the next instruction block address) points to the instruction block to be compared (as used herein, that is, the current instruction block and the next instruction block) is determined by whether the offset in the instruction locates within the length of the instruction block or whether the instruction address is the instruction address in the instruction block to be compared. It is understood that the disclosed judgment method are for illustrative purposes and not limiting, other judgment methods may be omitted.

Next, the specific implementation of the scanner that generates the address is provided. As shown in FIG. 4C, the scanner performs a filtering operation by the following way: the scanner adds the block offset of the current instruction (i.e., the address offset of the current instruction address corresponding to the instruction block containing the instruction) to the branch offset of the branch instruction by an adder to obtain a total offset. Base on the total offset, it is judged whether the target address of the branch instruction points to the current instruction block or the next instruction block of the current instruction block, thus filtering the generated address.

Further, in addition to the current instruction block and the next instruction block, more instruction blocks may be compared, thereby further filtering the generated address. Based on the sum of the branch offset and the second address (BNY) of the branch source, the known instruction block number registered in the easy-to-read register is selected. The principle is as follows: the low bit portion in the sum of the branch offset and the second address which has the same length as whose length is the same as the length of the second address is truncated; the remaining high bit portion is the distance counted by the number of blocks between the instruction block containing the branch target instruction and the current instruction block (the instruction block containing the branch source). If the high bit is 0, the branch target is in the current block; if the high bit is +1, the branch target is in the next instruction block of the current instruction block; if the high bit is −1, the branch target is in the previous instruction block of the current instruction block; and so forth. The current instruction block refers to an instruction block which is being scanned by the scanner; the next instruction block refers to an instruction block whose instruction address is the address length of one instruction block more than the address of the current instruction block; the previous instruction block refers to an instruction block whose instruction address is the address length of one instruction block less than the address of the current instruction block.

FIG. 4D illustrates an exemplary target address determination 400 in the scanner consistent with the disclosed embodiments. As shown In FIG. 4D, it is understood that the scanner 108 is for illustrative purposes and not limiting, certain components or devices may be omitted. The following procedure is the same as the procedure in FIG. 4B: if the scanner 108 examines two instructions of the instruction input block 404, at most two branch target addresses may be calculated. The two branch target addresses are sent to the two same judgment logic (judgment logic 442 and the judgment logic 444), respectively. In this embodiment, the module 402 in the scanner 108 is the same as the module 402 in FIG. 4B. The output instruction type is sent directly to the track table 110 and written to the corresponding position. The procedure is not displayed in FIG. 4D. As used herein, it is only judged whether the branch target address is located in three consecutive instruction blocks containing the current instruction block. The judgment method for whether the branch target address is located in more consecutive instruction blocks containing the current instruction block is also similar.

In FIG. 4D, register 448 stores the block number corresponding to the current instruction block. Register 446 stores the block number corresponding to the instruction block before the current instruction block. Register 450 stores the block number corresponding to the instruction block after the current instruction block. The block number may be not continuous but the corresponding address of the instruction block is continuous. Thus, if the branch target address calculated by the scanner 108 is located between the start address and the end address of three consecutive instruction blocks, it is not required to access the active list 104. The corresponding block numbers are obtained directly from register 446, register 448, and register 450. If the branch target address calculated by the scanner 108 is not located between the start address and the end address of three consecutive instruction blocks, the branch target address is sent to the active list 104 to perform a matching operation.

For determination logic 442, for example, the inputs of calculation module 452 include the branch target address 424 and the block address of the current instruction block 418, and the output of calculation module 452 is selection signal 458. The calculation module 452 may be implemented by a subtractor. The difference between the branch target address and the block address of the current instruction block is the address difference between the branch target address and the first instruction of the current instruction block. The low bit portion of the address difference whose length is the same as the second address is truncated, while the remaining high bit portion as the selection signal 458 controls the selector 460 to select the instruction block number stored in the register. If the high bit of the address is −1, the block number in register 446 is selected; if the high bit of the address is 0, the block number in register 448 is selected; if the high bit of the address is +1, the block number in register 450 is selected; if the high bit of the address is not −1/0/+1, the branch target address selected by selector 446 is sent to the active list 104 to find the appropriate block number, and at the same time selector 460 selects the output of active list 104. The block number 462 outputted by the selector 460 is filled to the track point (entry) specified by the branch source address in the track table.

In the present embodiment, it is assumed that the active list 104 may perform a matching operation for one branch target address only every time. Therefore, if the scanner 108 finds two branch instructions during one examination and these two branch instructions are not in the three continuous instruction blocks, the branch target addresses selected by selector 428, in turn, are sent to the active list 104 to perform a matching operation. The active list 104 may send sequentially matched or allocated block number 430 to the selector 460 in these two logic judgments for selection.

It is noted that a specific implementation of the branch target address classification is only provided according to the technical solutions of the present invention. The judgment logic 442 and the judgment logic 444 may also be implemented by other methods. For example, calculation function of the branch target address may be implemented by a calculation module, as shown in FIG. 4E.

FIG. 4E illustrates modified exemplary judgment logic 470 consistent with the disclosed embodiments. In the present embodiment, active list 104, register 446, register 448, and register 450 are the same as these components in FIG. 4D. It is also assumed that the judgment logic 470 includes two same classification logics (classification logic 472 and classification logic 474). For classification logic 472, the inputs of calculation module 472 include the block address of the current instruction block 418, the offset 478 of the branch instruction in the instruction block and the branch offset 420 of the branch instruction.

The same as described in the previous embodiment, in the calculation module 476, the branch target address 424 may be obtained by the sum of the current instruction block address 418, the address offset of the current branch instruction in the instruction block (BNY) 478, and branch offset 420 of the branch instruction. The address offset 478 of the current branch instruction in the instruction block is added to the branch offset 420 to obtain the address difference in FIG. 4D. The address difference whose low bit portion is truncated is used as a select signal 458 which is used to select the appropriate instruction block number to output as block number 462. The remaining operations are the same as previous example.

As shown in FIG. 4D, register 446, register 448 and register 450 are shift registers. When the first address pointer of the instruction tracker points to a new instruction block, the content of the register must be moved from one register to another register. The memory 480 may be implemented by a circular buffer with a plurality of entries, and adding a current instruction block pointer 478, a start pointer, and an end pointer. The entry pointed to by the current instruction block pointer 478 includes the current instruction block. When the position of the current instruction block changes, the content stored in each entry does not move, but the pointer 478 moves. The start pointer and the end pointer indicate start point and end point of the address consecutive single instruction block or plural instruction blocks.

It is assumed that in the circular buffer 480, the pointer address of an entry 446 is '−1', storing block number of previous one instruction block; the pointer address of an entry 448 is '0', storing block number of the current instruction block; the pointer address of an entry 450 is '+1', storing block number of next instruction block. The pointer 478 of the current instruction block with a value '0' points to entry 448; the start pointer with a value '−1' points to entry 446; the end pointer with a value '+1' points to entry 450. At this time, the instruction block represented by the instruction block number in entry 448 is scanned. If judgment logic 472 determines that the target of the detected branch instruction is located in the current instruction block (the selection signal 458 is '0'), the selector selects the content of the entry 448 to output as block number 462. In the next moment, if the instruction block represented by the instruction block number in entry 450 is scanned, the pointer 478 of the current instruction block with a value '+1' points to the entry 450; if judgment logic 472 determines that the target of the detected branch instruction is located in the current instruction block (the selection signal 458 is '0'), selector 460 also selects the content of the entry 448 to output as block number 462. But this is wrong, because the current block is represented by the entry 450, there is a deviation of the entry compared with the previous time. The deviation may be compensated by adding the value of the current instruction block pointer 478 to the control signal of the original selector 460. That is, the low bit portion of the sum of the address offset '0' of the current branch instruction address in the instruction block and the branch offset 420 is truncated, then the high bit portion of the sum plus the value of the current instruction block pointer 478 to serve as selection signal 458. The compensated value of the selection signal 458 is '0+1', i.e., equal to '1', which selects the instruction block number of entry 450 to output as block number 462. Then, the instruction number of the next instruction block is filled to entry 446, and the end pointer points to a new end entry 446. The content of the entry pointed to by the start pointer is replaced by the block number of the next instruction block, therefore the start pointer moves down an entry to point to the entry of the start point 448. In other examples, if the content of the entry pointed to by the start pointer is not replaced, the start pointer maintains unchanged.

If movement distance or movement direction of the current instruction block pointer is different from the previous example, as long as the current instruction block pointer is still in the range indicated by start pointer and end pointer (the value of start pointer<the value of current instruction block pointer 478<the value of end pointer), the instruction block number obtained from circular buffer 480 is outputted as block number 462. If out of range, over-range detection logic (not shown in FIG. 4E) sends the instruction block address 424 to the active list 104 to find the corresponding instruction block number; selector 460 may select the output of active list 104 as block number 462 to be sent and stored in the track table.

As used herein, the target instruction block may be temporarily stored in the output register 304 of the instruction memory 106. When the branching occurs successfully, the target instruction block that becomes the current instruction block is filled to the instruction read buffer 112; similarly, instruction information extracted by the scanner 108 and block number information outputted by active list 104 are temporarily stored in a register. If the branching occurs successfully, the information is filled to the track table 110.

When a new track is to be created, the new track may be placed at an available row of track table 126. If the new track includes a branch track point (corresponding to a branch source instruction) then a branch track point may be created at an entry of the row. The positions of the row and entry of the branch point in track table 126 are determined by the branch source address. For example, the row may be determined based on the upper address of the branch source address, and the entry may be determined based on the offset of the branch source address.

Further, each entry or track point in the row may have a content format including a type field, a first address (an XADDR) field, and a second address (a YADDR) field. Other fields may also be included. Type field may indicate the type of instruction corresponding to the track point. As previously explained, an instruction type may include conditional branch instruction, unconditional branch instruction, and other instructions. XADDR field may be called a first-dimension address or simply a first address. YADDR field may be called a second-dimension address or simply a second address.

Further, the content of the new track point may correspond to the branch target instruction. In other words, the content of the branch track point stores the branch target address information. For example, the row number or block number of a particular row in track table 110 corresponding to the branch target instruction is stored as the first address in the branch track point. Further, the offset address of the branch target within its own track is then stored as the second address in the branch track point. This offset address can be calculated based on the branch source instruction address and the branch offset (distance).

Ending points of all tracks in the track table are tagged as a particular track point. The content of the particular track point may include category information for branching, and position information of the next track including the next instruction executed in sequence. The next instruction corresponds to the first track point of the next track. Therefore, the particular track point may only have a content format including a type field and a first address (an XADDR) field, or a constant (such as '0') in addition to a type field and a first address (an XADDR) field.

FIG. 5A shows an exemplary track point format 500 consistent with the disclosed embodiments. As shown in FIG. 5B, non-ending track point may have a content format including an instruction type 520, a first address 504, and a second address 506. The instruction type of at least two track points of the track may be read out at the same time. Therefore, the instruction types of all non-ending track points in the track may be stored together, while the first address and the second address of these non-ending track points may be stored together. The ending track point may only have a content format including an instruction type 502 and a first address 504, and a constant 508 with a value '0'. Similarly, instruction type 502 of the ending track point and non-ending track points may also be stored together, while the first address 504 and constant 508 may be stored in the following of the first address and the second address of all non-ending track points of the track. Further, the second address of the ending track point is the constant 508 with a value '0', therefore the constant may not be stored. The second address '0' is produced directly when tracker 114 points to the ending track point.

FIG. 5B shows an exemplary method to create new tracks using track table consistent with the disclosed embodiments. As shown in FIG. 5B, BNX represents block number of a memory block containing an instruction block. Instruction read buffer 112 is a subset of instruction memory 106. The track in track table 110 corresponds to memory block in instruction read buffer 112. The instruction blocks represented by various block number in track table 110 are also a subset of instruction memory 106. Therefore, content addressable memory (CAM) 536 includes block number information corresponding to each track. The track number corresponding to the block number is determined by performing a matching operation for the block number in CAM 536 to find the corresponding track in track table 110.

As shown in FIG. 5B, an existing track 522 (denoted as BNX0) may include three branch instructions or branch points 524, 526, and 528. When examining branch point 524 (a target block number BNX7 is matched or assigned in the active list), a new track 530 (next available row denoted as BNX7) is created to contain the target instruction of branch point 524, and the block number in track table 110 (i.e., BNX7) is recorded in branch point 524 as the first address. Similarly, when examining branch point 526 (a target block number BNX9 is matched or assigned in the active list), another new track 532 (denoted as BNX9) is created in track table 110 and the block number is recorded in branch point 526; when examining branch point 528 (a target block number BNX1 is matched or assigned in the active list), another new track 534 (denoted as BNX1) is created in track table 110 and the block number is recorded in branch point 528. Therefore, new tracks corresponding to all branch points in a single track may be created.

As used herein, the second address stored in the track point of each branch instruction is an offset of the instruction block containing the branch target instruction of the branch instruction.

FIG. 5C illustrates an exemplary track table in the scanner consistent with the disclosed embodiments. The parts or components without relevance may be omitted in the present embodiment in FIG. 5C. It is assumed that scanner 108 may examine all instructions in one instruction block to extract instruction type 554 once, but the active list 104 may not perform match operation for branch target addresses of all branch instructions once, that is, it is impossible that all matched or allocated target block number 552 are sent to the memory 548 which is used to store the target block number. In order to reduce memory write cycles in track table 110, the information may not be written directly to memory 550 to store the instruction type and memory 548 to store the target block number in the track table 110, alternatively, the information is stored into the temporary register 542, firstly. The capacity of the temporary register 542 is the same as the capacity of a row in the track table 110 (i.e., a track, including a row of memory 550 and memory 548). The information in the temporary register 542 is written to the memory 550 and the memory 548 together in the track table 110 when the temporary register 542 is full.

In FIG. 5C, the instruction type 554 of all instructions in the instruction block from the scanner 108 is simultaneously written to the temporary register 542, and the target block number 552 is sequentially written into the temporary register 542. After the information about all instructions in the instruction block is written to temporary register 542, the information of all instructions in the instruction block is written to the memory 550 and the memory 548. As used herein, if the current generated instruction is the block number corresponding to the branch target address of indirect addressing branch instruction, the block number does not need to be stored in the track table 110, alternatively the block number may be directly bypassed as the output of the selector 544. In addition, if the track corresponding to the block number pointed to by the first address pointer of the read pointer of the tracker 114 is stored in the memory 550 and the memory 548, the selector 546 and the selector 544 select instruction type and the target block number outputted by the memory 550 and the memory 548 to the tracker 114, respectively. Otherwise, the selector 546 and the selector 544 select instruction type and the target block number outputted by the temporary register 542 to the tracker 114, respectively. Thus, when all track points in a track is not fully filled, the needed content may be read out.

It should be noted that, in FIG. 5C, the memory 550 and the memory 548 may be two completely independent memories, or belong to two different logic memories in the same physical memory. Similarly, in the specific implementation, the temporary register 542 and the two memories together may also be located in the same physical memory. Further, the temporary register 542 is placed within the track table 110, and is for illustrative purposes and not limiting. For logical layout or physical realization, the temporary register 542 may also be placed outside the track table 110. The present disclosure can be understood by those skilled in the art in light of the description, the claims, and the drawings of the present disclosure.

The described above various embodiments use a direct addressing mode to calculate the branch target address and implement an instruction prefetching operation. However, an indirect addressing mode may also be used. In the indirect addressing mode, at the beginning, the register value (e.g., a base register value) is determined, thereby calculating the branch target address. The register value is changed based on the result of instruction execution. Therefore, when a new value is calculated by a base register value instruction in a last updating indirect addressing branch instruction but the value is not written to the base register, the new value may be obtained by a bypass path to perform the target address calculation and subsequent operations. FIG. 5D illustrates an exemplary the instruction position updated by base register value 560 with the disclosed embodiments.

As shown in FIG. 5D, track 562 includes a series of track points constituted by information sent by scanner 108 and active list 104. As used herein, a track is composed of 16 track points. A track point corresponds to one instruction. The sixth track point 566 and the fourteenth track point 574 correspond to a direct addressing branch instruction, respectively. The tenth track point 570 corresponds to an indirect addressing branch instruction with base register BP1. When scanner 108 examines an instruction in the instruction block, all updating the value of register 'BP1' instructions may be found in the instruction block, that is, the instructions corresponding to the third track point 564, the eighth track point 568 and the twelfth track point 572. Therefore, track point 568 corresponding to the last updating base register BP1 instruction before indirect addressing branch track point 570 may be determined. An interval number between the track point 568 and indirect addressing branch track point 570 is 2, that is, an interval of two instructions. Thus, the number of interval instructions (i.e., value '−2') may be recorded in the content of indirect addressing branch track point 570.

As used herein, when the branch instruction corresponds to track point 566 does not take a branch, the read pointer of the second address in tracker 114 points to track point 570. The content of track point 570 is read out, including the number of interval instructions '2'. Thus, when the position value of the instruction executed currently by the processor in the track (i.e., low address offset of program counter) is less and equal to '2' than the value of the read pointer of the second address in the tracker 114, the base register value is updated. At this time, the base register value BP1 may be obtained from the processor core 116, performing the branch target address calculation and the subsequent operations.

As used herein, the base register value may be obtained through a variety of methods, such as an additional read port of the register in the processor core 116, the time multiplex mode from the register in the processor core 116, the bypass path in the processor core 116, or an extra register file for data prefetching.

In modern processor architecture, the value of base register is generally calculated by arithmetic unit. In the conventional structure, register file stores the values of various registers including the base register value. The register value outputted by the register file or values of other sources constitutes an input value of the arithmetic unit in the processor core, and the register value outputted by the register file or values of other sources constitutes another input value of arithmetic unit. The arithmetic unit calculates these two input values and sends the result to the register file. For illustrative purposes, as used herein, the arithmetic unit has two inputs and one output. For arithmetic unit with more or less inputs and more outputs, the process is similar. Here, the two register values outputted by the register file may be the value of the same register, or the values of different registers. The result of the operation may be written back to the register which has the same source as these two register values, or written to different registers.

FIG. 5E illustrates an exemplary base register value obtained by an extra read port of a register consistent with the disclosed embodiments. As shown in FIG. 5E, the operation process, that is, input value 577 and input value 579 are operated by execution unit EX 575 and the result 581 is written back to register file 587, is the same as the process in general processor architecture. The difference is that register file 587 has one more read port 589 than register file in general processor architecture. Thus, when getting to the time point for calculating data addressing address, the corresponding base register value is read out by the read port 589 to calculate the data addressing address.

FIG. 5F illustrates an exemplary base register value obtained by a time multiplex mode consistent with the disclosed embodiments. As shown in FIG. 5F, the operation process, that is, input value 577 and input value 579 are operated by EX 575 and the result 581 is written back to register file, is the same as the process in general processor architecture. The difference is that the output 577 and output 579 from register file are also sent to selector 591, and then the result selected by selector is outputted as the base register value 593. Thus, after the base register value is updated, if at least one input of the following instruction operands corresponding to EX 575 is not from register file, a read port of the register corresponding to the input value outputs the base register value; or if at least one input is the base register value, register value 583 or 585 is the base register value. The selector 591 selects the base register value as output 593 to calculate the data addressing address.

FIG. 5G illustrates an exemplary base register value obtained by the bypass path consistent with the disclosed embodiments. As shown in FIG. 5G, the operation process, that is, input value 577 and input value 579 are operated by EX 575 and the result 581 is written back to register file, is the same as the process in general processor architecture. The difference is that the result 581 is not only written back to register file but also sent out by bypass path 595. Thus, when EX 575 is performing the operation of updating the base register value, the result of the operation is the updated base register value. Therefore, the value sent by the bypass path 595 is the needed base register value to calculate the data addressing address. The bypass path method needs to know the correct time point that generates the result of the operation 581. The time point may be determined by the instruction interval number in FIG. 5D. As shown in FIG. 5D, if the instruction interval number is '–2', when processor core 116 executes the second instruction before the data access instruction, the result of the operation outputted by EX 575 is the needed base register value.

FIG. 5H illustrates an exemplary base register value obtained by an extra register file for data prefetching consistent with the disclosed embodiments. As shown in FIG. 5H, the operation process, that is, input value 577 and input value 579 are operated by EX 575 and the result 581 is written back to register file, is the same as the process in general processor architecture. The difference is that there is an extra register file 597 that is a shadow register file of the old register file. All write values of the base register of the old register file are written to the corresponding register of register file 597 at the same time. Thus, all updating operations for the base register in the old register file are reflected to register file 597. Therefore, when getting to the time point for calculating the data addressing address, the base register value 599 may be read out from register file 597 to calculate the data addressing address. In physical implementation, register file 597 may be located in any appropriate position inside the processor core or outside the processor core.

To solve the bottleneck of active list 104 and reduce power consumption, recently used instruction block address and the corresponding instruction block number are stored in pairs in a small and fast memory that is called a mini active list. The matching pair of the mini active list is the subset of matching pairs with the line number and the addresses of the instruction line in active list 104. When a branch target address to be matched is calculated by the scanner 108, at the beginning, a matching operation is performed in the mini active list. If the matching operation is not successful, a matching operation is performed in active list 104, thereby reducing access times of the active list 104. The mini active list is composed of content-addressable memory and data memory. The instruction block address is stored in the content-addressable memory; the corresponding instruction block number is stored in the same line of the data memory. The address of the input instruction block matches with a plurality of the instruction block addresses in the content-addressable memory of the mini active list. If there is no match, the mini active list sends the address of the input instruction block to the active list 104 to perform a matching operation; if there is a match, the address is read out from the data memory and the instruction block number is outputted. The mini active list and the active list may also work in parallel, performing multiple address matching operations at the same time.

The mini active list may be a separate unit, or combine with the content-addressable memory of the track table 110 or instruction read buffer 112 because both of them have similar structure and data storage. Storage part of the instruction block address in mini active list and storage part of the instruction block number are the structure of the content-addressable memory and are data memory for each other. The content-addressable memory containing the mini active list is bi-direction addressable, i.e. the inputting address of the instruction address block may output the corresponding instruction block number; the inputting address of the instruction address block number may output the corresponding address of the instruction address block. Thus, the content-addressable memory containing the mini active list may provide the following functions: searching the instruction block number from the addresses of the instruction address block provided by the scanner as the content of the track table; matching the corresponding track and instruction block from the instruction block number provided by the tracker; searching the corresponding instruction block address from the current instruction block, using the next instruction block address of the instruction block address as the block address of the next sequential execution instruction block; searching the corresponding track/instruction block from above described block address.

FIG. 5I is a track table containing a mini active list consistent with the disclosed embodiments. As shown in FIG. 5I, the track table 110 and the instruction read buffer 112 need to store the instruction block number. Track table 110 also includes the block address of the instruction block corresponding to each track. Therefore, each block number in the track table 110 and the corresponding address constitutes a matching pair with an instruction block address and a block number. Thus, a mini active list is constituted in the track table 110. The parts or components without relevance may be omitted in the present embodiment in FIG. 5I. The main portion of the track table 110, that is memory 584 used to store instruction type, branch target block number and block offset, is the same as the structure in previous embodiments. Memory 584 may include or not include the temporary register. The difference is that a content-addressable memory 588 is used to store the block address corresponding to each track, and the content-addressable memory 586 is used to store the block number corresponding to the block address. Thus, the corresponding lines of the content-addressable memory 586 and the content-addressable memory 588 form a matching pair with instruction block address and block number.

When the branch target address to be matched is calculated by the scanner 108, the branch target address by bus 590 is sent to the content-addressable memory 588 to perform a matching operation. If there is a match, a successful matching entry indexes the content of the corresponding row (the block number corresponding to the target address) in the content-addressable memory 586, and the content is outputted to the selector 598 by bus 592. The content is written to the main portion of the track table (memory 584) after selection. If there is no match, the branch target address is sent to the active list 104 to perform a matching operation. The active list 104 sends the matched or allocated block number to the selector 598 by bus 596. Then, selector 598 selects the block number from the active list 104 and writes the block number to the main portion of the track table (memory 584).

When the branch instruction is executed successfully and branching occurs, the instruction tracker 114 may send the branch target block number contained in the branch track point by a bus 594 to the content addressable memory 586 to perform a matching operation. If there is a match, the track corresponding to the branch target instruction block is created, i.e., the branch target instruction block is stored in the instruction read buffer 112, no filling operation is needed. If there is no match, the track corresponding to the branch target instruction block is not created, i.e., the branch target instruction is not stored in the instruction read buffer 112. The branch target block number by bus 594 needs to be sent to the instruction memory 106 to perform an addressing operation. The target instruction is outputted from the instruction memory 106 to perform the follow-up operation described in the previous embodiments.

FIG. 6A is an exemplary movement of the read pointer of the tracker 600 consistent with the disclosed embodiments. As shown in FIG. 6A, the read pointer of the tracker skips the non-branch instructions in the track table, and moves to the next branching point of the track table to wait for branch determination result judged by the processor core 116. The parts or components without relevance may be omitted in the present embodiment in FIG. 6A. In the present embodiment, assuming that the instruction type stored in the memory 550 and the instruction information stored in the memory 548 are arranged from left to right based on the instruction address from small to large, i.e., when these instructions are executed in sequence, access order of each instruction information and the corresponding instruction type is from left to right. It is also assumed that the instruction type '0' in the memory 550 indicates that the corresponding instruction in the memory 548 is a non-branch instruction, and the instruction type '1' in the memory 550 indicates that the corresponding instruction in the memory 548 is a branch instruction. The entry representing the instruction pointed to by the second address 616 (block offset, BNY) in a track pointed to by the first address 614 (block number, BNX) in the memory 548 may be read out at any time. A plurality of entries, even all entries on behalf of the instruction type in a track pointed to by the first address 614 in the memory 550 may be read out at any time. If the total number of tracks in the track table is equal to the total number of tracks represented by the first address, the first address may point to the corresponding track after decoding addressing. If the comparison result is unequal, the track number of the track is stored in the memory in matching unit 536 by using the content address method. A side-by-side comparison is performed between the first address and all the track numbers in the matching unit 536. The track with the track number corresponding to the first address is the track to be selected. Matching unit 536, memory 550 and memory 548 together constitute the track table 110.

On the right of the entry of the instruction with the largest instruction address in each row of the memory 550 and memory 548, an end entry is added to store the address of the next instruction being executed in sequence. The instruction type of the end entry is always set to '1'. The first address of the instruction information in the end entry is instruction block number of the next instruction. The second address (BNY) is always set to zero and points to the first entry of the instruction track. The end entry is defined as an equivalent unconditional branch instruction. When the tracker points to an end entry, an internal control signal is always generated to make selector 608 to select the output 630 of the memory 548; another internal control signal is also generated to update the value of register 610. The internal signal may be triggered by the special bit in the end entry of the memory 550 or the memory 548, or the end entry pointed to by the second address 616.

In FIG. 6A, the tracker 114 mainly includes a shifter 602, a leading zero counter 604, an adder 606, a selector 608 and a register 610. A plurality of instruction types representing a plurality of instructions read out from the memory 550 are shifted to the left by shifter 602. The shifting bits are determined by the second address pointer 616 outputted by the register 610. The most left bit of the shifted instruction type 624 outputted by the shifter 602 is a step bit. The signal of the step bit and BRANCH signal from the processor core together determines the update of the register 610. The selector 608 is controlled by the signal TAKEN. The output 632 of the selector is the next address which includes the first address portion and the second address portion. When TAKEN is '1' (there is a branch), the selector 608 selects output 630 of the memory 548 (including the first address and the second address of the branch target) as the output 632. When TAKEN is '0' (there is no branch), the selector 608 selects the current first address 614 as the first address portion of the output 632 and the output 628 of the adder as the second address portion of the output 632. Instruction type 624 is sent to the leading zero counter 604 to calculate the number of '0' instruction type (representing the corresponding instruction is a non-branch instruction) before the next '1' instruction type (representing the corresponding instruction is a branch instruction). The number of '0' instruction 'type is calculated as a (one) '0' regardless of the step bit is a '0' or '1'. The number 626 (step number) of the leading '0' is sent to the adder 606 to be added with the second address 616 outputted by the register 610 to obtain the next branch source address 628. It should be noted that the next source branch address is the second address of the next branch instruction of the current instruction, and non-branch instructions before the next source branch address are skipped by the tracker 114.

When the second address points to an entry representing an instruction, the shifter controlled by the second address shifts a plurality of the instruction types outputted by the memory 548 to the left. At this moment, the instruction type representing the instruction read out by the memory 550 is shifted to the most left step bit of the instruction type 624. The shift instruction type 624 is sent into the leading zeros counter to count the number of the instructions before the next branch instruction. The output 626 of the leading zero counter 604 is a forward step of the tracker. This step is added to the second address 616 by the adder 606. The result of the addition operation is the next branch instruction address 628.

When the step bit signal of the shifted instruction type 624 is '0', which indicates that the entry of the memory 550 pointed to by the second address 616 is a non-branch instruction, the step bit signal controls the update of the register 610; the selector 608 selects next branch source address 628 as the second address 616 under the control of TAKEN signal 622 '0' and the first address 614 remains unchanged. The new first and second address point to the next branch instruction in the same track, non-branch instructions before the branch instruction are skipped. The new second address controls the shifter 616 to shift the instruction type 618, and the instruction type representing the branch instruction is placed in step bit 624 for the next operation.

When the step bit signal of the shifted instruction type 624 is '1', it indicates that the entry in the memory 550 pointed to by the second address represents branch instruction. The step bit signal does not affect the update of the register 610, while BRANCH signal 634 from the processor core controls the update of the register 610. The output 628 of the adder is the next branch instruction address of the current branch instruction in the same track, while the output 630 of memory is the target address of the current branch instruction.

When the BRANCH signal is '1', the output 632 of the selector 608 updates the register 610. If TAKEN signal 622 from the processor core is '0', it indicates that the processor core determines to execute operations in sequence at this branch point. The selector 608 selects the source address 628 of the next branch. The first address 614 outputted by the register 610 remains unchanged, and the next branch source address 628 becomes the new second address 616. The new first address and the new second address point to the next branch instruction in the same track. The new second address controls the shifter 616 to shift the instruction type 618, and the instruction type representing the branch instruction bit is placed in step bit 624 for the next operation.

If the TAKEN signal 622 from the processor core is '1', it indicates that the processor core determines to jump to the branch target at this branch point. The selector selects the branch target address 630 read out from the memory 548 to become the first address 614 outputted by the register 610 and the second address 626. In this case, the BRANCH signal 634 controls the register 610 to latch the first address and the second address as the new first address and the new second address, respectively. The new first address and the new second address may point to the branch target addresses that are not in the same track. The new second address controls the shifter 616 to shift the instruction type 618, and the instruction type representing the branch instruction bit is placed in step bit 624 for the next operation.

When the second address points to the end entry of the track table (the next line entry), as previously described, the internal control signal controls the selector 608 to select the output 530 of the memory 548, and update the register 610. In this case, the new first address 614 is the first address of the next track recorded in the end entry of the memory 548, and the second address is zero. The second address controls the shifter 616 to shift the instruction type 618 to zero bit for starting the next operation. The operation is performed repeatedly, therefore the tracker 114 may work together with the track table 110 to skip non-branch instructions in the track table and always point to the branch instruction.

FIG. 6B illustrates an exemplary determination of time point 650 of the indirect branch target address calculation consistent with the disclosed embodiments. The instruction interval 666 stored in the indirect branch track point pointed to by the read pointer 616 of the second address of the tracker 114 is outputted by the track table 110 and sent to the adder 654. The other input of the adder 654 is the value of the read pointer 616 of the second address of the tracker 114, i.e., the position of the indirect branch instruction. The position 668 for last updating base register instruction is obtained by adding the instruction internal 666 to the position of the indirect branch instruction in the adder 654. The position 668 is sent to the comparator 656. The other input of the comparator 656 is the instruction address 670 outputted by the processor core 116. The comparison result is sent to the register 660 to control the update of its value.

Further, the read pointer 616 of the second address in data tracker 114 outputted by the instruction read buffer 112 points to the address offset 674 of the instruction and the base register number 672. The base register number is sent to the processor core 116 to obtain the corresponding value of the register 676, and the obtained value of the register 676 is sent to the adder 662. The address offset 674 is directly sent to the adder 662. Thus, the adder 662 may calculate and generate an indirect branch target address.

When the value of the position 668 is equal to the instruction address 670 outputted by the processor core 116, it indicates that the corresponding value of the base register is (or has been) updated. The result calculated by the adder 662 is the indirect branch target address corresponding to the indirect branch instruction, which is stored in the register 660. The indirect branch target address may be sent to the active list 104 to perform a matching operation.

Further, because the time point used to update the value of the base register is pre-calculated, and the base register number and the address offset are provided in advance by the instruction read buffer 112, the time advance may be relatively large, i.e., for many indirect branch instructions to be executed, before the corresponding indirect branch instruction is actually executed by the processor core 116, it is possible that the above-mentioned time points is already calculated and the base register number and the address offset are already provided. Therefore, a buffer 658 is added to store temporarily the above-mentioned time point, the base register number and the address offset. The buffer 658 may calculate the indirect branch target address when sequentially reaching the time point for updating the base register value corresponding to each indirect branch instruction.

As used herein, when the entries in the active list 104 are full and a new row address/line number matching pair needs to be created, the active list 104 needs to be replaced, that is, an existing row address/line number matching pair in the active list 104 is replaced by the new row address/line number matching pair; the corresponding instruction block in the instruction memory 106 is replaced by the new instruction block. The content of each branch track point in the track table 110 includes the block number of the branch target track point (i.e., the first address) and the block offset (i.e. the second address). If a matching pair and the corresponding instruction cache block in the active list 104 corresponding to the block number of the branch target track point stored in the track table 110 is replaced, the block number remains unchanged, but the stored content represented by the block number has been changed, resulting in the track point points to the wrong instruction block. An extra correlation table may be added to record whether each matching pair of the active list 104 is used as the information about branch target of the track point in the track table.

FIG. 7A illustrates an exemplary correlation table 700 consistent with the disclosed embodiments. For convenience of explanation, the correlation table in FIG. 7B is logically classified as the active list 104. The parts or components without relevance may be omitted in the present embodiment in FIG. 7A.

In addition to data address addressing unit 202, the active list 104 in the present embodiment further includes a correlation table 702. The number of entries in the correlation table 702 is the same as the number of entries in the data address addressing unit 202, forming a one-to-one relationship. Each entry in the correlation table 702 represents the reference times of the row number in the matching pair of the corresponding data address addressing 202 in the track table 110 is (i.e., used as a target block number). In the specific implementation, the times may be for the number of the track points of said block number to be used as the target block number, or the number of the track including this type of the track point. The initial value of each entry in the table 702 is set to '0'.

As used herein, when the active list 104 (or mini active list) is matched or allocated a block number, using this block number as an index 708, the value of the corresponding entry is read out from the correlation table 702 and sent to the arithmetic unit 704. The control signal 710 which indicates that the block number is an effective block number is outputted to the arithmetic unit 704. The arithmetic unit 704 adds '1' to the value of the corresponding entry, and the result of the addition operation is sent back to the corresponding row in the correlation table 702. Thus, the value of the corresponding entry (i.e., the reference times of the corresponding block number) increases '1'. As used herein, the control signal 710 may be a valid bit 220 in FIG. 2A, or other appropriate signals stored in the active list 104. When a track is replaced from the track table 110, exit unit 706 scans the track and extracts all the target block numbers. Using these block numbers as index 712, the value of the corresponding entry is read out from the correlation table 702 and sent to arithmetic unit 704, and control signal 714 is outputted to the arithmetic unit 704. The arithmetic unit 704 subtracts '1' from the value of the corresponding entry, and then the result of the subtraction operation is sent back to the corresponding row in the correlation table 702. Thus, the value of the corresponding entry (i.e., the reference times of the corresponding block number) decreases '1'. Thus, the entry with value '0' in the correlation table 702 represents that the corresponding matching pair in the data address addressing unit 202 is not referred to by the track table 110. Therefore, these matching pairs may be replaced by new row address/row number pairs and no error is generated. The replace logic of the active list (or instruction memory) only replaces the corresponding entry with value '0' in the correlation table.

FIG. 7B illustrates an exemplary correlation table 750 consistent with the disclosed embodiments. For convenience of explanation, the correlation table in FIG. 7B is also logically classified as the active list 104. The parts or components without relevance may be omitted in the present embodiment in FIG. 7B.

In addition to the data address addressing unit 202, the active list 104 in the present embodiment further includes a correlation table 752. Each entry in the correlation table 752 contains only one flag bit, corresponding to a matching pair in the data address addressing unit 202. The flag bit '1' indicates that the block number corresponding to the matching pair is referred to by the track table 110. The flag bit '0' indicates that the block number corresponding to the matching pair is not referred to by the track table 110.

Further, the read pointer 758 of extra scanner 754 sequentially scans each track point in each track in the track table 110. Once the read pointer 758 points to the track point containing the target block number (such as a branch track point or an end track point), the target block number is read out and used as address 760 to perform a set operation for the corresponding flag bit in correlation table 752 (i.e., the value of the flag bit is set to '1'). An circular pointer 756 shifts through each flag bit in sequence in the correlation table 752 at a slower speed than the speed of read pointer 758 in scanner 754, and a clear operation is performed for the shifted flag bit (the value of the flag bit is cleared to '0'). Thus, if the shifting speed of the read pointer 758 is much faster than the shifting speed of the circular pointer 756, the value of the flag bits corresponding to the block numbers which are referred to by the track table 110 may be all set to '1'; while the value of the flag bits corresponding to the block numbers which are not referred to by the track table 110 may be all set to '0'. The matching pairs with flag bit value '0' may be replaced to accommodate new row address/row number matching pairs.

As used herein, the instruction read buffer 112 stores the instructions to be executed by the processor core 116, and the processor core 116 may obtain the instructions with minimum waiting time. FIG. 8A illustrates an exemplary configuration 800 for the processor core through cooperation of an instruction read buffer, an instruction memory and a track table.

As shown in FIG. 8A, the instruction read buffer 112 is composed of the register set 802, and the capacity of the register set including the current instruction block being executed by the processor is the same as the capacity of an instruction block. For convenience of explanation, it is assumed that an instruction block only contains two instructions, i.e., the register set 802 contains registers that may only store two instructions. It is similar when the instruction block contains more instructions.

The current instruction block containing the instruction to be executed by the processor core 116 is stored in the register set 802. That is, if the instruction to be executed by the processor core is not in the current instruction block, based on the first address pointer 614 of the tracker 114, the instruction block containing the instruction is read out from the instruction memory 106 and stored in the register set 802. At the same time, the instruction information extracted by the scanner 108 and the block number information outputted by the active list 104 are stored in the track table 110 to create a track which corresponds to the instruction block. There is a one-to-one correspondence between the track in the track table 110 and the instruction block in the instruction read buffer 112. Therefore, only one track is in the track table 110 in the present embodiment, while the tracker 114 updates the read pointer according to the previous described methods.

When the current instruction being executed by the processor core 116 is not the last instruction of the instruction block and the processor core 116 fetches the next instruction in sequence, the next instruction is stored in the register set 802. Therefore, selector 804 and selector 806 select the inputs from the register set 802. Based on the low bit 810 of the program counter (i.e., the offset of the next instruction in the instruction block), the selector 808 selects the required instruction for the processor core 116 from the incoming instruction block. Thus, the processor core 116 may obtain the instruction with minimum waiting time.

When the current instruction being executed by the processor core 116 is the last instruction of the instruction block and the processor core 116 fetches the next instruction in sequence, as the next instruction is located in the next instruction block, therefore the next instruction is not stored in the register set 802. As used herein, the next instruction block is being prefetched, or it has been prefetched and stored in the instruction memory 106. If the instruction block has been stored in the instruction memory 106, the instruction block is indexed by the first address pointer 614 of the tracker 114 (i.e., the instruction block number). The instruction block is read out and outputted to the selector 808 by the selector 804 and the selector 806. Based on the low bit 810 of the program counter (i.e., the offset of the next instruction in the instruction block, that is, the first instruction), the selector 808 selects the required instruction for the processor core 116 from the incoming instruction block. If the instruction block is being prefetched, after the instruction block is fetched and written to the instruction memory 106, the required instruction for the processor core 116 is selected by the above described method. Furthermore, the bypass path may be set in the instruction memory 106, thus the required instruction may be selected once the instruction block is prefetched.

When the branch instruction executed by the processor core 116 takes a branch and the branch target instruction needs to be fetched, if the branch target instruction is in the current instruction block, the selector 804 and the selector 806 select the input from the register set 802. Based on the low bit 810 of the program counter (i.e., the offset of the branch target instruction in the instruction block), the selector 808 selects the required instruction for the processor core 116 from the incoming instruction block.

If the branch target instruction is not in the current instruction block, according to the technical solutions of the present invention and the previous described embodiment, the instruction block containing the branch target instruction is prefetched and stored in the instruction memory 106, or is being prefetched. If the instruction block is stored in the instruction memory 106, the instruction block is indexed by the first address pointer 614 of the tracker 114 (i.e., the instruction block number). The instruction block is read out and outputted to the selector 808 by the selector 804 and the selector 806. Based on the low bit 810 of the program counter (i.e., the offset of the branch target instruction in the instruction block), the selector 808 selects the required instruction for the processor core 116 from the incoming instruction block. If the instruction block is being prefetched, after the instruction block is fetched and written to the instruction memory 106, the required instruction for the processor core 116 is selected by the above described method. Furthermore, the bypass path may be set in the instruction memory 106, thus the required instruction may be selected once the instruction block is prefetched.

FIG. 8B illustrates an improved exemplary configuration 830 for the processor core 800 through cooperation of an instruction read buffer, an instruction memory, and a track table. In the present embodiment, the active list 104, the instruction memory 106, the scanner 108 and the tracker 114 are the same as these components in the embodiment in FIG. 8A. The difference is that a memory 832, rather than a register set, is included in the instruction read buffer 112. The memory 832 may accommodate at least two instruction blocks. Accordingly, the track table 110 also accommodates the corresponding number of tracks, and there is a one-to-one correspondence between the tract and the instruction block in the memory 832.

In the present embodiment, once the processor core 116 executes a new instruction block, the tracker 114 reads out the content of the track point in the track corresponding to the instruction blocks (i.e. the next instruction block number when executes in sequence). The content of the track point are sent to the track table 110 and the instruction memory 106 through the first address pointer 614. The block number in the track table 110 matches with the block number corresponding to each track. If there is a match, the next instruction block is already stored in the memory 832; if there is no match, the next instruction block is not stored in the memory 832, and it needs to be written to the memory 832.

As used herein, the next instruction block is prefetched and stored in the instruction memory 106, or it is being prefetched. If the next instruction block is stored in the instruction memory 106, the instruction block is indexed by the first address pointer 614 of the tracker 114 (i.e., the block number of the next instruction block). The instruction block is read out and stored in the instruction read buffer 112 in the memory 832. If the next instruction block is being prefetched, after the instruction block is fetched and written to the instruction memory 106, the instruction block is stored to the memory 832 by the above-described method. If the memory 832 is full, replacement algorithm (such as least-recently used algorithm LRU or at least frequently used replacement algorithm LFU) is used to replace an existing instruction block by the next instruction block. Similarly, when the next instruction block is written into the memory 832, the corresponding track is created in the corresponding position of the track table 110 at the same time.

Thus, both the current instruction block and the next instruction block are stored in the instruction read buffer 112. Whether the next instruction of the current instruction executed by the processor core 116 is in the same instruction block (i.e., the current instruction block) or in the next instruction block, after the value of the first address pointer 614 of the tracker 114 (i.e., the block number corresponding to the instruction block containing the next instruction) matches with the block number corresponding to each track in the track table 110, the corresponding instruction block may be found in memory the 832 in the instruction read buffer 112 based on the matching result 834. Thereafter, the selector 804 and the selector 806 select the instruction block from the memory 832. Based on the low bit 810 of the program counter (i.e., the offset of the next instruction in the instruction block), the selector 808 selects the required instruction for processor core 116 from the incoming instruction block.

When the branch instruction executed by the processor core 116 takes a branch, and the branch target instruction needs to be fetched, the tracker 114 sends the value of the read pointer 614 of the first address (i.e., branch target block number of the branch instruction) to the track table 110 and performs a matching operation with the block number of each track. If there is a match, the instruction block containing the branch target instruction is already stored in the memory 832. The instruction block may be indexed by the matching result 834 in the memory 832, thereby reading out the instruction block. Thereafter, the selector 804 and the selector 806 select the instruction block from the memory 832. Based on the low bit 810 of the program counter (i.e., the offset of the next instruction in the instruction block), the selector 808 selects the required instruction for processor core 116 from the incoming instruction block.

If there is no match, the instruction block containing the branch target instruction is not stored in the memory 832. As used herein, the target instruction block containing the branch target instruction is prefetched and stored in the instruction memory 106, or it is being prefetched. If the target instruction block is stored in the instruction memory 106, the instruction block is indexed by the first address pointer 614 of the tracker 114 (i.e., block number of the target instruction block), thereby reading out the instruction block. The selector 804 and the selector 806 select the instruction block outputted by the memory 832 to the selector 808. Based on the low bit 810 of the program counter (i.e., the offset of the branch target instruction in the instruction block), the selector 808 selects the required instruction for the processor core 116 from the incoming instruction blocks. If the instruction block is being prefetched, after the instruction block is fetched and written to the instruction memory 106, the required instruction for the processor core 116 is selected by the above described method. Furthermore, the bypass path may be set in the instruction memory 106, thus the required instruction may be selected once the instruction block is prefetched.

FIG. 8C illustrates another improved exemplary providing instruction 860 for the processor core through cooperation of an instruction read buffer, an instruction memory, and a track table. In the present embodiment, the active list 104, the instruction memory 106, the scanner 108 and the tracker 114 are the same as these components in the embodiment in FIG. 8B. The difference is that, in addition to a memory 832, an output register set 862 is included in the instruction read buffer 112. The capacity of the output register set 862 including the current instruction block being executed by the processor is the same as the capacity of an instruction block. For convenience of explanation, it is assumed that an instruction block only includes two instructions, i.e., the register set 862 only includes a register that may store two instructions. It is similar when an instruction set includes more instructions. Thus, when the processor core 116 obtains the current instruction from the output register set 862, the port of the memory 832 may be used to provide the branch target instruction or the next instruction not included in the current instruction block. Thus, the memory with a single port and the register together may provide two independent instructions at the same time.

Specifically, it is similar with the previous described embodiment. The output register set 862 may provide directly the current instruction block; memory 832 may provide the next instruction block or the branch target instruction block based on the matching result 834 of the first address pointer 614 in the tracker 114 in the track table; instruction memory 106 branch may provide the branch target instruction block based on the first address pointer 614 in the tracker 114. The selector 864 and the selector 866 select the instruction block from the matching results of the above three memory units based on the instruction block containing the required instruction for the processor core 116. If the instruction block (i.e., the instruction block is the current instruction block) is in the output register set 862, the selector 864 and the selector 866 select the instruction block outputted by the output register set 862 and send the instruction block to the selector 808. If the instruction block is in the memory 832 (i.e., the instruction block is the next instruction block, or the branch target instruction block stored in the memory 832), the selector 864 and the selector 866 select the instruction block outputted by the memory 832 and send the instruction block to the selector 808. Otherwise, the selector 864 and the selector 866 select the instruction block outputted by the instruction memory 106 or the instruction block outputted by the instruction memory 106 (or bypass) after completing the prefetching operation and send the instruction block to the selector 808. Based on the low bit 810 of the program counter, the selector 808 selects the required instruction for processor core 116 from the incoming instruction block by the method described in the previous embodiment.

As used herein, in the improved embodiment, when the processor core 116 obtains the next fetched instruction of the branch instruction, the next instruction and the branch target instruction of the branch instruction executed in sequence is outputted to the processor core 116 at the same time. FIG. 9A illustrates an exemplary configuration 900 providing the next instruction and the branch target instruction for the processor core. After the processor core fetches the next instruction and the branch target instruction of the branch instruction executed in sequence at the same time, some pipeline stages (such as fetch stage and decoding stage) before two pipelines may execute some operations for these two instructions in parallel, such as fetch, decoding, etc. After it is determined whether a branch is taken, the processor core selects the intermediate result of a pipeline to continue executing the remaining operations of the pipeline stages, thereby increasing the throughput of the processor core and implementing zero wait of the branch.

In the present embodiment, the active list 104, the instruction memory 106, the scanner 108 and the tracker 114 are the same as these components in FIG. 8C. The difference is that, in addition to the memory 832 and the output register set 862, two sets of selection structure are included in the instruction read buffer 112. Selector 904, selector 906 and selector 908 are used to select and output the next instruction 902. Selector 910, selector 912 and selector 914 are used to select and output branch target instruction 916.

In the present embodiment, the output register set 862 may provide the current instruction block and the next instruction block; the memory 832 may provide the next instruction block or the branch target instruction block based on the matching result 834 of the first address pointer 614 of the tracker 114 in the track table; the instruction memory 106 may provide the branch target instruction block based on the first address pointer 614 of the tracker 114. The selector 908 is controlled by the program counter 810 to select the next instruction 902 from the current instruction block; the selector 910 is controlled by the second address in the content of the branch track point read out from the track table (the second address of the branch target address 630) to select the target instruction 916 from the target instruction block.

If the instruction currently executed by the processor core 116 is not a branch instruction and the next instruction is in the current instruction block, the selector 904 and the selector 906 select the instruction block outputted by the output register set 862 and send the outputted block to the selector 908. Based on the low bit 810 of the program counter, the selector 908 selects the required instruction for the processor core 116 from the incoming instruction block by the method described in the previous embodiment.

If the instruction currently executed by the processor core 116 is not a branch instruction and the next instruction is in the next instruction block (the current instruction is the last instruction of the instruction block), after the value of the first address pointer 614 of the tracker 114 (i.e., the block number corresponding to the next instruction block containing the next instruction) matches with the block number corresponding to each track in the track table 110, the corresponding next instruction block may be found in the memory 832 in the instruction read buffer 112 based on the matching result 834. The selector 904 and the selector 906 select the instruction block outputted from the memory 832 and send the instruction block to the selector 908. Based on the low bit 810 of the program counter, the selector 808 selects the required next instruction 902 for the processor core 116 from the incoming instruction block.

If the instruction currently executed by the processor core 116 is a branch instruction, when the next instruction 902 is outputted by the above-described method, the selector 910 and the selector 912 select the branch target instruction block from the instruction memory 106 and the memory 832. If the next instruction is in the current instruction block, the selector 910 and the selector 912 select the branch target instruction block from the memory 832 first (no read operation for the instruction memory 106 to save power consumption). Only when the branch target instruction block is not in the memory 832, the branch target instruction block is selected from the instruction memory 106. If the next instruction is in the next instruction block (the current instruction is the last instruction of the instruction block), the selector 910 and the selector 912 select the branch target instruction block from the instruction memory 106. Based on the low bit of the branch target address (i.e., the offset of the branch target instruction in the branch target block), the selector 908 selects the required branch target instruction 916 for the processor core 116 from the incoming instruction block by the above described methods.

FIG. 9B illustrates another exemplary configuration 950 providing the next instruction and the branch target instruction for the processor core. As shown in FIG. 9B, the active list 104, the instruction memory 106, a scanner 108, a tracker 114, an output register set 862, a selector 904, a selector 906, a selector 908, a selector 910, a selector 912, and a selector 914 are the same as these components in FIG. 9A. The difference is that memory 952 with a dual output port in FIG. 9B replaces the memory 832 with a single output port in FIG. 9A. Based on the different addressing 958 and 834, the two output ports 954 and 956 of the memory 952 output the next instruction block and the branch target instruction block, respectively.

Therefore, the output register set 862 may provide directly the current instruction; the memory 952 may provide the next instruction block and the branch target instruction block at the same time; the instruction memory 106 may provide the branch target instruction block.

If the instruction block containing the next instruction is in the output register set 862 (i.e., the instruction block is the current instruction block), the selector 904 and the selector 906 select the instruction block outputted by the output register set 862 and send the outputted instruction block to the selector 908; otherwise, the selector 904 and the selector 906 select the next instruction block outputted by the port 954 of the memory 952 and send the outputted instruction block to the selector 908. Based on the low bit 810 of the program counter, the selector 908 selects the next instruction 902 from the incoming instruction block and sends the next instruction to the processor core 116 by the method described in the previous embodiment.

If the instruction block containing the branch target instruction is in the memory 952, the selector 910 and the selector 912 select the branch target instruction outputted by the output port 956 of the memory 952 and send the outputted branch target instruction to the selector 914; otherwise, the selector 910 and the selector 912 select the branch target instruction block outputted by the instruction memory 106 or the branch target instruction block outputted by the instruction memory 106 (or the bypass path) after completing the prefetching operation and send the outputted branch target instruction to the selector 914. Based on the low bit of the branch target address, the selector 914 selects the branch target instruction 916 from the incoming instruction block and sends the branch target instruction to the processor core 116 by the above described methods.

The dual output port memory 952 provides the next instruction block and the branch target instruction block at the same time, thus reducing the access times of the instruction memory 106 and reducing power consumption.

As used herein, the particular program to be executed frequently is permanently stored in the specified location in the instruction memory 106; also the corresponding instruction line address/line number matching pair is created in the specific location in the active list 104, thus reducing replacement times of the instruction line. At least one additional memory unit is used to store this kind of the specific program in the instruction memory 106. That is, the start address of the instruction corresponding to the memory unit is a special address. The start address does not need to be matched in the active list 104 to reduce the capacity of the active list 104. FIG. 10 illustrates an exemplary instruction memory 1000 including a memory unit for storing the particular program. For convenience of explanation, the register 304 in the instruction memory 106 is not displayed in FIG. 10, and an additional memory unit 1002 is described. The instruction memory containing more memory units is also similar.

In FIG. 10, in addition to the instruction memory unit 302 (not shown in FIG. 10), the instruction memory 106 includes a memory unit 1002 that is used to store a particular program, for example, an exception handling program. There is a one-to-one correspondence between the matching pair in the active list 104 and the instruction line in the instruction memory unit 302. The instruction line in the memory unit 1002 is a specific line and corresponds to a specific line number. Therefore the corresponding matching pair does not need to be created in the active list 104. These specific line numbers and line numbers in the matching pairs do not conflict with each other. In addition, each memory line in the memory unit 1002 has a corresponding valid bit 1004 that is used to indicate whether the corresponding specific instruction line is stored in the memory line. As used herein, after the processor core 116 starts, the valid bit 1004 is set to 'invalid'. The fill engine 102 uses the idle time of the fetching operation to obtain these specific instruction lines. These specific instruction lines are written into the memory 1002, and the corresponding valid bit is set to 'valid'.

As used herein, the scanner may perform the following operations in addition to the operations described in the previous embodiment. Preferentially, the branch target address or the address of the next instruction block matches with the address corresponding to the instruction line in the memory unit 1002 and the corresponding valid bit is checked. If there is a match and the instruction line is valid, it indicates that the required instruction line is stored in the memory unit 1002 and the matching operation in the active list 104 does not need to be performed, that is, the required instruction line may directly output the specific line number. In addition, when an instruction block from the instruction memory 106 needs to be filled into the instruction read buffer 112, if the instruction block is an instruction block containing the instruction line corresponding to these specific line numbers, the selector 1008 controlled by control signal 1006 selects the instruction block from the memory unit 1002 and sends the instruction block to the instruction read buffer 112; otherwise, the selector 1008 controlled by control signal 1006 selects the instruction block from the instruction memory unit 302 and sends the instruction block to the instruction read buffer 112.

FIG. 11A illustrates an exemplary matching unit 1100 used to select the instruction block. For convenience of explanation, it is assumed that the relationship among the instruction line, the instruction block, the line number and the block number is the same as the relationship in FIG. 3B. Thus, the instruction block number (the first address, BNX) is one more than the memory block number. The high bit of the instruction block number is the memory block number of the instruction block in the memory. It is also assumed that the low bit of the instruction block number is equivalent to the fourth bit of the 32-bit instruction address to distinguish two different instruction blocks in the same memory block. Thus, the second address (BNY) is the 3rd bit to the 2nd bit of the 32-bit instruction address. BNY is used to perform an instruction addressing operation in the instruction block, while the first bit and the zero bit represent different bytes in an instruction.

In the present embodiment, as shown in FIG. 3B, it is assumed that an instruction line in the instruction memory 106 corresponds to two instruction blocks in the read buffer 112, and different instruction blocks in the same instruction line are distinguished by the 4th bit of the instruction address. As used herein, each instruction block in the instruction read buffer 112 has a corresponding matching unit. For convenience of explanation, only two matching units, that is, a matching unit 1102 and a matching unit 1122 are shown in FIG. 11A. For example, the register 1104 in the matching unit 1102 stores an instruction block number (BNX), which corresponds to an instruction block in the instruction read buffer 112 and a track in the track table. The comparator 1110 of the matching unit 1102 is used to compare the block number of the register 1104 with the first address 614 outputted by the tracker 114, and output the comparison result ('match' or 'no match'). Write Enable of the register 1108 is controlled by the BRANCH signal 634 outputted by the processor core 116. When the BRANCH signal 634 is valid, the value of the register 1108 is updated. The value of the register 1108 and the output of the comparator 1104 are sent to OR gate 1107 to perform a logical OR operation. The comparator 1106 in the matching unit 1102 is used to compare the 4th bit 1119 of the instruction address outputted by the processor core 116 with the 4th bit of the instruction block number stored in the register 1104. The comparison result and the value outputted by the OR gate 1107 together are sent to AND gate 1114 to perform a logical AND operation. If the comparison result is 'match' and the value outputted by the OR gate 1107 is valid, the AND gate 1114 outputs 'valid', indicating that the corresponding instruction block in the instruction read buffer 112 is the required instruction block for the processor core 116. Otherwise, the AND gate 1114 outputs 'invalid', indicating that the corresponding instruction block in the instruction read buffer 112 is not the required instruction block for the processor core 116. Thus, the required instruction block for the processor core 116 is figured out. In addition, the output of the comparator 1110 is also sent to the track table 110 to indicate the current track. The current track is used for related move operations of the read pointer of the instruction tracker 114.

A register 1124, a comparator 1126, a register 1128, a comparator 1130, an OR gate 1127, an AND gate 1134 in the matching unit 1222 corresponds to a register 1104, a comparator 1106, a register 1108, a comparator 1110, an OR gate 1107, an AND gate 1114 in the matching unit 1102, respectively. Similar operations are performed by these components.

The matching unit is described below by a specific example. For ease of illustration, in the present embodiment, it is assumed that the target instruction block is prefetched into the instruction memory 106, and the target instruction block and the adjacent next instruction block are not yet written to the instruction read buffer 112. For other cases, the similar operations referred to by the description of the previous embodiments may be performed. As used herein, the read pointer of the tracker 114 stops at the second branch track point after the current instruction being executed in the processor core 116 (the end track point is used as the branch track point). Further, for clarity purposes, the scanner 108 and the active list 104 are omitted in FIG. 11A.

If the current branch instruction takes a branch, the first address (block number) in content 630 of the branch track point read out from the track table 110 may be used to perform an addressing operation in the instruction memory 106. The branch target instruction block is read out by the bus 1117. The processor core 116 receives and selects the instruction in the target instruction block from the bus 1117 as the instruction to be executed in the next step.

According to the described technical solution in the previous embodiment, the replacement logic in the instruction read buffer 112 and the track table 110 point out a track (e.g., track 1116) and an instruction block (e.g., instruction block 1118) which can be replaced. The matching unit corresponding to the track 1116 and the instruction block 1118 is the matching unit 1102.

Accordingly, certain instruction information, such as instruction type examined and extracted by the scanner 108 and the block number matched or allocated by the active list 104, etc., is stored in the track 1116 in the track table 110. At the same time, the first address in content 630 of the track point is stored in the register 1104 of the matching unit 1102, and the target instruction block on the bus 1117 is stored in the instruction block 1118 in the instruction read buffer 112.

After that, the replacement logic in the track table 110 and the instruction read buffer 112 point to the next track (e.g., track 1120) and the next instruction block (e.g., instruction block 1138) which can be replaced. The matching unit corresponding to the track 1120 and the instruction block 1138 is the matching unit 1122.

At the same time, the address of the next block adjacent to the instruction block 1118 may be calculated. The block number corresponding to the next matched instruction block in the active list 104 (i.e., the first address) is stored in the end track point of the track 1116 and sent to the instruction memory 106 to perform an addressing operation. The next instruction block adjacent to the instruction block 1118 is read out by the bus 1117 from the instruction memory 106. Similarly, certain instruction information, such as instruction type examined and extracted by the scanner 108 and block number matched or allocated by active list 104, etc., is stored in the track 1120 in the track table 110. At the same time, the first address (i.e., the block number corresponding to the next instruction block) in the content 630 of the track point is stored in the register 1124 of the matching unit 1122, and the instruction block on the bus 1117 (i.e., the next instruction block) is stored in the instruction block 1138 in the instruction read buffer 112.

Because the branch instruction takes a branch, the selector 608 controlled by TAKEN signal 622 selects the branch target track point position information of the branch instruction from the bus 630 as the output. The value of the register 610 controlled by BRANCH signals 634 is updated to the first address and the second address of the branch target track point. The value of the corresponding registers (e.g., the register 1108 in the matching unit 1102, the register 1128 in the matching unit 1122) in various matching units is also controlled by BRANCH signal 634 to be updated. The outputs of the previous described comparators (e.g., the comparator 1110 in the matching unit 1102, the comparator 1130 in the matching unit 1122) are written to these registers.

After the value of the register 610 is updated, the value of the read pointer 614 of the new first address (i.e., the block number of the current track) is sent to various matching units, and the value matches with the block number stored in the register (such as register 1104, register 1124, etc.). The comparator 1110 in the matching unit 1102 outputs the comparison result that there is a match, while the comparators in other matching units output the comparison result that there is no match. Therefore, the output of the comparator 1110 selects the track 1116, making the track 1116 to become the current track. The read pointer 616 of the new second address moves from the track point of the track 1116 corresponding to the second address stored in the register 610 to the next branch track point. The content of the branch track point is read out by the bus 630.

In the two inputs of the OR gate 1107 in the matching unit 1102, the input from the comparator 1110 is '1', and the input from the register 1108 is '0', so the output of the OR gate 1107 is '1'. The two inputs of the corresponding OR gates in other matching units (such as the OR gate 1127 of the matching unit 1122, etc.) are '0', so the outputs are '0'. The required instruction for the processor core 116 is in the instruction block corresponding to the track 1116. As shown in FIG. 3B, the fourth bit 1119 of the instruction address sent by the processor core 116 is the same as the LSB of the block number stored in the register 1104. Therefore, the comparator 1106 outputs 'match' results (i.e., output '1'). The two inputs of the AND gate 1114 are '1', and its output is '1', thus selecting instruction block 1118 as the current instruction block that is sent to the processor core 116 by bus 1115. The corresponding AND gates (e.g., AND gate 1127 in the matching unit 1122, etc.) are '0' in other matching units, and the outputs of the corresponding AND gates are '0', therefore other instruction blocks are not selected.

Next, it is assumed that the current track does not include a branch track point, or the current track includes a branch track point but the branch is not taken. The read pointer of the tracker 114 continues to move to the end track point. The next track block number information stored in the track point is then read out by the bus 630.

The end track point is used as a branch track point indicating that the branch must be taken. TAKEN signal 622 selects the next track information from the bus 630 as the output of the selector 608. Branch signal 634 controls the value of the register 610 and updates the value to the first address and the second address of the first track point of the next track. At the same time, BRANCH signal 634 also controls the update of the value of the corresponding register (e.g., the register 1108, the register 1128, etc.) in each matching unit. The last outputs of the comparators (e.g., comparator 1110, comparator 1130, etc.) are stored into these registers, thereby storing the last comparison result of the comparator.

After the value of the register 610 is updated, the value of the read pointer 614 of the new first address (i.e., the block number of the next track) is sent to various matching units to match with the block number stored in the register in each matching unit (e.g., register 1104, register 1124, etc.). The comparator 1130 in the matching unit 1122 outputs the comparison result "match", while comparators in other matching units output the comparison result "no match". Therefore, the output of the comparator 1130 selects the track 1120, thus the track 1120 becomes the moving track for the read pointer of the tracker 114. The read pointer 616 of the new second address moves from the track point of the track 1120 corresponding to the second address stored in the register 610 to the next branch track point. The content of the branch track point is read out by the bus 630.

In the two inputs of the OR gate 1102 in the matching unit 1102, the input from the comparator 1110 is '0', and the input from the register 1108 is '1', so the output of the OR gate 1107 is '1'. In the two inputs of the OR gate 1127 in the matching unit 1122, the input from the comparator 1130 is '1', and the input from the register 1128 is '0', so the output of the OR gate 1127 is also '1'. Thus, the instruction block 1118 corresponding to the matching unit 1102 and the instruction block 1138 corresponding to the matching unit 1122 are likely to be selected. The two inputs of the corresponding OR gates in other matching units are '0', so the outputs are '0'. The instruction block 1118 and the instruction block 1138 are two instruction blocks with adjacent instruction address. As shown in FIG. 3B, the values of the least significant bits of the block addresses (block number) of the two instruction blocks are opposite. Therefore, based on the fourth bit 1119 of the instruction address of the required instruction for the processor core 116, one of the two comparators 1106 and 1126 outputs the comparison result 'match' (i.e., output '1'). Thus, one of the AND gates 1114 and 1134 outputs '1'. The selected instruction block from the instruction block 1118 or the instruction block 1138 is sent to the processor core 116 by the bus 1115. The instruction block includes the required instruction for the processor core. Thus, the moving operation of the read pointer of the tracker 114 and the fetching operation of the processor core 116 need not occur synchronously, i.e., the track pointed to by the read pointer of tracker 114 and the instruction block read out by the processor core 116 in the fetching operation may be not correspond to each other.

During the follow-up operation, when the value of the register 610 is updated again and points to another track (the track is not the track 1116 or the track 1120), BRANCH signal 634 controls the update of the value of the corresponding register (register 1108, register 1128, etc.) in the matching unit. The last outputs of the comparators (e.g., comparator 1110, comparator 1130, etc.) are stored into these registers. After the value of the register 610 is updated, the value of the read pointer 614 (i.e., the block number of the new track) of the new first address is sent to various matching units to match with the block number stored in the register (e.g., register 1104, register 1124, etc.). Thus, the output result of the comparator 1110 is 'no match', and the value stored in the register 1108 is '0', so that the outputs of the OR gate 1107 and the AND gate 1114 are '0', i.e. the instruction block 1118 has no chance to be selected. If the output of the comparator 1130 is 'no match', but the value stored in the register 1128 is '1', the output of the OR gate 1127 is '1', i.e., the instruction block 1138 is still the instruction block that has chance to be selected. As previously described, after each matching unit performs a matching operation for the value of the read pointer 614 (block number) of the first address, a track corresponding to the block number and an instruction block that may be selected may be found. Similarly, according to the 4th bit 1119 of the instruction address sent by the processor core 116, an instruction block containing the required instruction for the processor core is selected from these two instruction blocks.

FIG. 11B illustrates another exemplary matching unit used to select the instruction block. As shown in FIG. 11B, the instruction read buffer is a dual port memory; in addition to the first port 1115, the second port 1192 is added. For example, register 1104, comparator 1106, register 1108, OR gate 1107 and AND gate 1114 in the matching unit 1152 are the same as these components in FIG. 11A. The difference is that the comparator 1110 in the matching unit 1152 is called the first comparator, and the second comparator 1150 is added. The second comparator 1150 is used to compare the block number stored in the matching unit 1152 with the target block number inputted by the bus 630, and the output of the second comparator is used as the word line for the second port of the instruction read buffer 112 to perform an addressing operation. Thus, the target instruction segment is read out by the bus 1190. Further, the output of the second comparator 1150 also points to the target track in the track table 110.

The matching unit is described below by a specific example. In the present embodiment, for convenience of explanation, it is assumed that the target instruction block is prefetched into the instruction memory 106. For other cases, the similar operations referred to by the description of the previous embodiments may be performed. As used herein, the read pointer of the tracker 114 stops at the second branch track point after the current instruction being executed by the processor core 116 (the end track point is used as the branch track points). Further, for clarity purposes, the scanner 108 and the active list 104 are omitted in FIG. 11B.

If the read pointer of the tracker 114 points to a branch track point, the first address in content 630 of the branch track point read out from the track table 110 (i.e., block number) is used to perform a matching operation in the corresponding second comparator in various matching units (e.g., the second comparator 1150, 1160, 1180, etc.). If there is no match, according to the methods in previous embodiments, the block number is sent to the instruction memory 106 to perform an addressing operation. The branch target instruction block read out by the bus 1194 is selected by the selector 1190 as the output to send to the processor core 116 by the bus 1117. If there is a match, based on matching results of the second comparators, an instruction block (the branch target instruction block) is read out from the second port of the instruction read buffer 112 by the bus 1192. The instruction block is selected by the selector 1190 as the output to send to the processor core 116 by the bus 1117. Further, the same as described embodiments in FIG. 11A, the current instruction block is sent to the processor core 116 by the bus 1115.

If the branch track point does not take a branch, the processor core 116 executes the next instruction after sequential execution of the branch instruction from the bus 1115. The read pointer of the tracker 114 continues to move until the next branch track point. The first address (i.e., block number) in the content 630 of the branch track point is read out and a matching operation is performed in the corresponding comparator in various matching units. The subsequent operations are performed by the previous described methods.

If the branch track point takes a branch, the processor core 116 executes the branch target instruction of the branch instruction from the bus 1117. As shown in FIG. 11A, the selector 608 controlled by TAKEN signal 622 selects the branch target track point position information of the branch instruction from the bus 630 as an output, while the value of the register 610 controlled by BRANCH signal 634 is updated to the first address and the second address of the branch target track point. The values of the corresponding registers in various matching units which are also controlled by the BRANCH signal 634 are updated. The last outputs of the first comparator are written to these registers. After the value of the register 610 is updated, the value of the read pointer 614 of the new first address is sent to the first comparator in various matching units to match with the block number stored in the register. Based on the matching results, the two instruction blocks that may be selected are determined by the method described in FIG. 11A. Based on the 4th bit 1119 of the instruction address sent by the processor core 116, an instruction block containing the required instruction for the processor core is selected from these two instruction blocks as the new current instruction block. The new current instruction block is then sent to the processor core 116 by the bus 1115. The subsequent operations are performed by the previous described methods.

FIG. 12A illustrates an exemplary instruction prefetching 1200 consistent with the disclosed embodiments. As shown in FIG. 12A, a fill engine 102, a scanner 108, an active list 104, a mini active list 1202, an instruction memory 106, an instruction read buffer 112 and a processor core 116 are the same as the components in the previous embodiments. The difference is that a register 1206, a selector 1226 and a selector 1228 are added in the tracker 114.

The register 1206 stores the branch target track point position information of the first branch track point after the current instruction, thus the read pointer of the tracker 114 may continue to move to point to the second branch track point.

The selector 1228 is controlled by END signal 1222 which indicates whether the read pointer 616 of the second address of the tracker 114 points to the end track point. When the read pointer 616 of the second address points to the end track point, the selector 1228 selects the content of the end track point (i.e., the block number of the next track) from the track table 110 as an output. Otherwise, the selector 1228 selects the addition result from the adder 606 as an output. Thus, when the read pointer 616 of the second address moves to the end track point of the track, the block number of the next track is written to the register 610 by the bypass path under the circumstances that the branch target track point position information of the first branch point stored in the register 1206 is not affected. Therefore, the read pointer of the tracker 114 moves to the next track and then points to the second branch point.

The selector 1226 is controlled by the branch instruction type pointed to by the read pointer of the tracker 114. When the branch instruction is an indirect branch instruction, the selector 1226 selects the value of the read pointer 614 of the first address as an output 1224; otherwise, the selector 1226 selects the branch target track point information 630 of the first branch point stored in the register 1206 as an output 1224. Thus, when the branch instruction is an indirect branch instruction, the branch target track point information 630 is forced to set as the track point position information of the indirect branch instruction, thereby allowing the instruction read buffer 112 to output the base register number of the indirect branch instruction and the address offset. The address offset may be an indirect branch instruction that is used to calculate the offset of the branch target address.

Further, the updating time point module used to judge the value of the base register in the embodiment of FIG. 6B is omitted in the present embodiment.

In the present embodiment, each memory block of the instruction memory 106 includes two address-consecutive instruction blocks; each instruction block 106 includes 8 instructions; each instruction includes 4 bytes. The instruction read buffer 112 includes a plurality of independent instruction blocks; the instruction addresses of the instruction blocks may be continuous or discontinuous; each block corresponds to a track in the track table 110. Track table 110 is composed of a matching unit 536, an instruction type memory 550 and a track point memory unit 548. The track point stored in the track point memory unit 548 includes the information related to the branch instruction, such as the first address of the branch target and the second address of the branch target.

In the present embodiment, the processor core 116 obtains the next instruction 1115 executed in sequence and the branch target instruction 1117 at the same time, and the structure of the matching unit 536 is the same as the structure of the matching unit 536 in FIG. 11B. The processor core 116 selects the correct instruction from the next instruction to be executed in sequence 1115 and the branch target instruction 1117 as a follow-up executed instruction based on the result of the executed branch instruction.

In the present embodiment, the instruction read buffer 112 is a memory with dual output ports. Based on the read pointer 614 of the first address of the tracker 114, the instruction read buffer 112 performs an addressing operation to find an instruction block (i.e., the current instruction block). Based on the low bit 1218 of the instruction address outputted by the processor core 116, at least one instruction from the instruction block is selected as an output of the first output port 1115 to send to the processor core 116; based on the track point information 1224 of the selector 1226, the instruction read buffer 112 performs an addressing operation to find the corresponding instruction block and sends the corresponding instruction block to the processor core 116 by the second output port 1117. When the branch instruction is an indirect branch instruction, the track point information 1224 is the track point information of the indirect branch instruction. Therefore, the second output port 1117 of the instruction read buffer 112 may output the base register number of the indirect branch instruction address and address offset. Otherwise, the track point information 1224 is the branch target track point 630. Therefore, the output of the second output port 1117 of the instruction read buffer 112 is the branch target instruction block.

The following is specifically described as an example in FIG. 12B. FIG. 12B illustrates an exemplary operation 1250 for instruction block consistent with the disclosed embodiments. FIG. 12B shows two tracks stored in the track table 110, two corresponding instruction blocks stored in the instruction buffer 112 and the corresponding instruction type stored in the instruction type memory 548.

The track number corresponds to track 1260 is '0' (i.e., BNX0). The second track point of BNX0 is a direct branch instruction. The track number corresponding to the next instruction block executed in sequence stored in the end track point 1264 is '3' (i.e., BNX3). Accordingly, in instruction type row 1252, the instruction type corresponding to the second instruction is '10', indicating that this instruction is a branch instruction (the second track point of No. 7 track corresponding to the branch target instruction of the branch instruction). The instruction types of other positions are '00', indicating that these instructions are not branch instructions (for simplicity, instruction type '00' is not shown in the present embodiment).

The track number corresponds to track 1262 is '3'(i.e., BNX3). The second track point of BNX3 is an indirect branch instruction. The track number corresponding to the next instruction block executed in sequence is stored in the end track point 1264. The second instruction in the instruction block 1270 corresponding to the track 1262 may provide the base register number and the offset of the corresponding indirect branch instruction. Accordingly, in the instruction type row 1254, the instruction type corresponding to the second instruction is '11', indicating that this instruction is an indirect branch instruction. The instruction types corresponding to other positions are '00', indicating that these instructions are not branch instructions.

Thus, the corresponding information is stored in the track table 110, the instruction type memory 550 and the instruction read buffer 112, and the next instruction block to be executed in sequence of instruction block 1268 is instruction block 1270. The following related operations are described in FIG. 12A based on the example in FIG. 12B. In the present embodiment, the branch target information of the first branch track point after the current instruction is stored in the register 1206, while the read pointer of the tracker 114 points to the second branch track point and waits for the execution result of the first branch track point.

The tracker 114 moves from the track point '00' (i.e., for No. 0 track point of No. 0 track, the value of the read pointer 614 of the first address is '0', and the value of the read pointer 616 of the second address is '0'). The tracker 114 moves the read pointer 616 of the second address, pointing to and stopping at the track point '02' (i.e., for No. 2 track point of No. 0 track, the value of the read pointer 614 of the first address is '0', and the value of the read pointer 616 of the second address is '2'). Based on the addressing operation of the read pointer of the tracker 114, the branch target instruction track point position '75' (i.e., No. 5 track point of No. 7 track) is read out from the track table and stored in the register 1206. At the same time, an addressing operation for the instruction read buffer 112 is performed by the track point position '75', thus reading out the instruction block corresponding to No. 7 track from the second output port 1117 of the instruction read buffer 112.

Then the tracker 114 continues to move until the position '08' (for the end track point of No. 0 track, the value of the read pointer 614 of the first address is '0', and the value of the read pointer 614 of the second address is '8') of the end track point is reached. Based on the read out track number '3', the read pointer of the tracker 114 directly points to the track point '30' (i.e., for No. 0 track point of No. 3 track, the value of the read pointer 614 of the first address is '3', and the value of the read pointer 616 of the second address is '0'). Then, the tracker 114 further moves the read pointer and stops at the track point '32' (i.e., for No. 2 track point of No. 3 track, the value of the read pointer 614 of the first address is '3', and the value of the read pointer 616 of the second address is '2').

If the branch corresponding to track point '02' takes a branch, the processor core 116 selects the branch target instruction from the second output port 1117 as the next instruction to be executed. The content stored in the register 1206 is updated to the register 610. Thus, the value of the read pointer 614 of the first address is '7'. The value of the read pointer 616 of the second address is '5'. The tracker 114 moves on No. 7 track and searches the next track point from No. 5 track point (for simplicity, No. 7 track is not shown in FIG. 12B).

If the branch corresponding to the track point '02' does not take a branch, the first read pointer 614 and the second read pointer 616 of the tracker 114 continue to stay and point to the branch track point '32'. As the instruction type '11' indicates that the instruction is an indirect branch instruction, after the selector 1226 selects the value of the read pointer 614 of the first address as output 1224 and sends the value to the matching unit 536 to perform a matching operation, the instruction interval number '−1' is read out from the track table 110. Further, the base register number and the indirect branch offset may be read out from the second output port 1117 of the instruction read buffer 112. The base register number is sent to the processor core 116 to obtain the value of the base register. The indirect branch offset is sent to adder 1236. When the program counter reaches the instruction corresponding to the track point '31' (the track point position value is obtained by adding the value '32' of the read pointer 616 to the instruction interval number '−1'), the value of the base register 1234 sent by the processor core 116 is used as the other input of the adder 1236 to calculate and generate the branch target address of the indirect branch 1238.

The branch target address 1238 is sent to the active list 104 to perform a matching operation. It is noted that the selector 1242 selects the branch target address 1238 as an output and sends the address 1238 to the active list (or mini active list) to perform a matching operation (decoding the type value read out by the instruction type memory 550 to determine the time point) only at this time; and the branch target address from the scanner 108 is selected as an output and sent to the active list (or mini active list) at other time. If there is no match in the active list 104 (i.e., the corresponding instruction block is not yet stored in the instruction memory 106), a new block number (BNX) is allocated by the active list 104. The branch target address 1238 is sent to the fill engine 102. The instruction block obtained from the external memory is filled to the instruction memory 106 based on the allocated block number. If there is a match in the active list 104, the block number corresponding to the address is read out from the active list 104.

If the branch instruction does not take a branch, the read pointer of the tracker 114 continue to search the next branch point along No. 3 track.

If the branch instruction takes a branch, the previous described block number is not filled to the track table 110. Alternatively, the block number is directly written to the register 610 by a bypass path to update the read pointer of the tracker 114. The block number is also sent to the matching unit 536 to perform a match operation. If there is a match in the matching unit 536, the track corresponding to the block number is in the track table 110, and the instruction block is in the instruction read buffer 112. If there is no match in the matching unit 536, the track corresponding to the block number is not yet created in the track table 110. The instruction corresponding to the block number from the instruction memory 106 is filled to the instruction read buffer 112, and the track corresponding to the branch target instruction block is created in the track table 110. The instruction track point pointed to by the read pointer 616 of the second address of the track pointed to by the read pointer 614 of the first address of the tracker 114 is read out from the track table 110. The read pointer of the tracker 114 moves to the next branch point from this point.

The subsequent operations are performed by the previous described methods and detailed descriptions are omitted here.

The above descriptions merely disclose certain embodiments of the present invention in FIG. 12A and FIG. 12B, and are not intended to limit the scope of the present invention. For example, the end track point may be used as the branch track point that must take a branch, and when the end track point is the second branch track point after the current instruction, the read pointer of tracker 114 may stay and point to the end track point until completing the execution of the first branch track point.

Without departing from the spirit and principles of the present invention, any modifications, equivalent replacements, and improvements, etc., should be included in the protection scope of the present invention. Therefore, the scope of the present disclosure should be defined by the attached claims.

INDUSTRIAL APPLICABILITY

The disclosed systems and methods may be used in various applications in memory devices, processors, processor subsystems, and other computing systems. For example, the disclosed systems and methods may be used to provide low cache-miss rate processor applications, and high-efficient data processing applications crossing multiple levels of caches or even crossing multiple levels of networked computing systems.

Sequence Listing Free Text

Sequence List Text

The invention claimed is:

1. A method for facilitating operation of a processor core coupled to a first memory containing executable instructions, a second memory with a faster speed than the first memory and a third memory with a faster speed than the second memory, the method comprising:
   examining instructions being filed from the second memory to the third memory, extracting instruction information containing at least branch information;
   creating a plurality of tracks in a track table based on the extracted instruction information;
   filling at least one or more instructions that will possibly be executed by the processor core based on one or more tracks from a plurality of instruction tracks from the first memory to the second memory; and
   filling at least one or more instructions based on one or more tracks from the plurality of tracks from the second memory to the third memory before the processor core executes the instruction, such that the processor core fetches the at least one or more instructions from the third memory,
   wherein all instruction types in the same track are read out once, and
   a tracker moves a read pointer to a track point corresponding to a first branch instruction after a current instruction based on the instruction type read out from the track.

2. The method according to claim 1, wherein:
   the tracks and instruction blocks in the third memory are one-to-one correspondence.

3. The method according to claim 1, wherein:
   the second memory and the third memory each has an output register, performing a new addressing operation when keeping the output value unchanged.

4. The method according to claim 1, wherein:
   a scanner judges a target instruction address to determine whether the target instruction belongs to the certain instruction block in the third memory.

5. The method according to claim 1, wherein:
   an entry format in the track table includes an instruction type, a first address and a second address;
   an entry format corresponding to an end track point includes the instruction type and the first address; and
   the second address corresponding to the end track point is a constant.

6. The method according to claim 1, wherein:
   a temporary register outside the track table is added to store information about the track that is being created, such that the entire track is written to the track table after the entire track is created.

7. The method according to claim 1, wherein:
   a distance between an instruction corresponding to a base register value in a last updating indirect branch instruction and the indirect branch instruction is recorded in the entry corresponding to the indirect branch instruction in the track table to determine a time point that completes the updating of the base register.

8. The method according to claim 1, wherein:
   a mini active list corresponds to track block numbers in a track table and instruction block addresses in an instruction read buffer.

9. The method according to claim 1, wherein:
a counter is used to record the times of a block number in an active list referred to by a track table, such that the current block number referred to by the track table cannot be replaced from the active list.

10. The method according to claim 1, wherein:
once a reference to a block number of an active list is found by scanning a track table, a flag bit of a corresponding block number of the active list is set; and
flag bits of various block numbers are reset in sequence in the active list, thus the set flag bit is used to indicate the current block number referred to by the track table and the current block number is not replaced from the active list.

11. The method according to claim 1, wherein:
the third memory provides a current instruction block.

12. The method according to claim 1, wherein:
the third memory provides a next instruction block.

13. The method according to claim 1, wherein:
the third memory or the second memory provides a target instruction block.

14. The method according to claim 1, wherein:
the third memory provides a current instruction block, and the third memory provides the target instruction block at the same time.

15. The method according to claim 1, wherein:
a current instruction block and a next instruction block together are found in the third memory by matching at the same time.

16. The method according to claim 1, wherein:
a current instruction block, a next instruction block and a target instruction block are found in the third memory by matching at the same time.

17. The method according to claim 1, wherein:
a required instruction is found from a current instruction block and a next instruction block based on partial bits of an instruction address.

* * * * *